(12) United States Patent
Nishimoto et al.

(10) Patent No.: US 11,424,959 B2
(45) Date of Patent: Aug. 23, 2022

(54) COMMUNICATION APPARATUS AND COMMUNICATION METHOD THAT CONTROL PROCESSING SEQUENCE OF COMMUNICATION PACKET

(71) Applicant: NIPPON TELEGRAPH AND TELEPHONE CORPORATION, Tokyo (JP)

(72) Inventors: Keita Nishimoto, Yokosuka (JP); Takashi Yamada, Yokosuka (JP); Akiyuki Takeda, Yokosuka (JP); Toshikiyo Tanaka, Tokyo (JP); Masashi Tadokoro, Yokosuka (JP); Takeaki Mochida, Yokosuka (JP); Manabu Yoshino, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 30 days.

(21) Appl. No.: 16/483,680

(22) PCT Filed: Feb. 7, 2018

(86) PCT No.: PCT/JP2018/004163
§ 371 (c)(1),
(2) Date: Aug. 5, 2019

(87) PCT Pub. No.: WO2018/147313
PCT Pub. Date: Aug. 16, 2018

(65) Prior Publication Data
US 2020/0021464 A1    Jan. 16, 2020

(30) Foreign Application Priority Data
Feb. 8, 2017 (JP) .............................. JP2017-021382

(51) Int. Cl.
*H04L 12/46* (2006.01)
*H04L 47/283* (2022.01)
*H04L 49/00* (2022.01)

(52) U.S. Cl.
CPC ........ *H04L 12/4641* (2013.01); *H04L 47/283* (2013.01); *H04L 49/70* (2013.01)

(58) Field of Classification Search
None
See application file for complete search history.

(56) References Cited

U.S. PATENT DOCUMENTS

| 6,272,450 B1 * | 8/2001 | Hill .................. | H04W 24/00 370/241 |
| 2005/0066149 A1 * | 3/2005 | Kanade ................ | G06F 9/4881 712/1 |

(Continued)

FOREIGN PATENT DOCUMENTS

| CN | 101035110 B | 1/2011 |
| JP | 2008066903 A | 3/2008 |

(Continued)

OTHER PUBLICATIONS

Japanese Office Action from counterpart JP2018567457, dated Jan. 7, 2020.

(Continued)

*Primary Examiner* — Christine T Duong
(74) *Attorney, Agent, or Firm* — Harness, Dickey & Pierce, P.L.C.

(57) ABSTRACT

A communication apparatus includes a packet reception unit; a packet transmission unit; and a processing sequence control unit that controls a processing sequence, and the processing sequence control unit includes a packet holding unit; function instances for respective function files including groups of procedures and groups of variables; an instance information management unit that holds instance (Continued)

information including function instance identifiers identifying the function instances, procedure identifiers identifying the procedures belonging to the function instances, and memory addresses of the procedures; an execution sequence information management unit that holds execution sequence information that associates the function instance identifiers, the procedure identifiers, return values of the procedures, and procedures belonging to function instances that are to be executed next; and a function execution unit that, on the basis of the execution sequence information and the instance information, calls a procedure, executes a process on the communication packet, and executes the next process depending on a return value.

8 Claims, 26 Drawing Sheets

(56) References Cited

U.S. PATENT DOCUMENTS

| | | | |
|---|---|---|---|
| 2008/0060074 A1 | 3/2008 | Okuyama | |
| 2013/0179584 A1* | 7/2013 | Mizunashi | H04L 69/02 709/230 |
| 2014/0294009 A1* | 10/2014 | Sahara | H04L 61/2514 370/392 |
| 2017/0019335 A1 | 1/2017 | Schultz et al. | |

FOREIGN PATENT DOCUMENTS

| | | |
|---|---|---|
| WO | WO-2016206742 A1 | 12/2016 |
| WO | WO-2017018965 A1 | 2/2017 |

OTHER PUBLICATIONS

Chios et al., ETSI, Network Functions Virtualisation—Introductory White Paper, 2012.

H. Kitada et al., Service Function Chaining Technology for Future Networks, NTT Technical Review, May 2014.

Y. Shinohara et al., A study on network control method and topology for service chaining, IEICE Technical Report, vol. 113, No. 472, pp. 403-408, 2014.

International Search Report (English and Japanese) for International Application No. PCT/JP2018/004163, dated May 1, 2018; ISA/JP.

ETRI, S. Lee et al.," Resource Management In Service Chaining draft-lee-nfvrg-resource-management-service-chain-01", Resource Management In Service Chaining; Draft-Lee-NFVRG-Resource-Management-Service-Chain-01-TXT, Internet Engineering Task Force, IETF: Standardworkingdraft, Internet Soceity (ISOC) 4, Rue Des Falaises CH-1205, Geneva, Switzerland, Mar. 9, 2015, pp. 1-11, XP015105479.

* cited by examiner

FIG. 4

| Row number | Execution instance ID | Execution procedure ID | Return value | Next execution instance ID | Next execution procedure ID |
|---|---|---|---|---|---|
| 1 | START (0) | START (0) | START (0) | 1 | 1 |
| 2 | 1 | 1 | 1 | 2 | 1 |
| 3 | 2 | 1 | 1 | 4 | 1 |
| 4 | 2 | 1 | 2 | 3 | 1 |
| 5 | 3 | 1 | 1 | 4 | 1 |
| 6 | 4 | 1 | 1 | START (0) | START (0) |
| 7 | 1 | 1 | -1 | START (0) | START (0) |
| ... | ... | ... | ... | ... | ... |

FIG. 5

| Row number | Function instance name | Procedure name | Instance ID | Procedure ID | Memory address |
|---|---|---|---|---|---|
| 1 | Dummy | Dummy | 0 | 0 | — |
| 2 | Reception | Reception | 1 | 1 | 0x000000 |
| 3 | VLAN-ID conversion | VLAN-ID conversion | 2 | 1 | 0x000100 |
| 4 | Filter | Filter | 3 | 1 | 0x000200 |
| 5 | Transmission | Transmission | 4 | 1 | 0x000300 |
| ... | ... | ... | ... | ... | ... |

FIG. 7

| Row number | Execution instance ID | Execution procedure ID | Return value | Next execution instance ID | Next execution procedure ID |
|---|---|---|---|---|---|
| 1 | START (0) | START (0) | * | 1 | 1 |
| 2 | 1 | 1 | 1 | 2 | 1 |
| 3 | 2 | 1 | 1 | 4 | 1 |
| 4 | 2 | 1 | 2 | 3 | 1 |
| 5 | 3 | 1 | 1 | 4 | 1 |
| 6 | 4 | 1 | 1 | START (0) | START (0) |
| 7 | 1 | 1 | -1 | START (0) | START (0) |
| ... | ... | ... | ... | ... | ... |

FIG. 9

| Row number | Execution instance ID | Execution procedure ID |
|---|---|---|
| 1 | 1 | 1 |
| 2 | 2 | 1 |
| 3 | 3 | 1 |
| 4 | 4 | 1 |

FIG. 12

| Function instance name | Procedure name | Instance ID | Procedure ID | Memory address |
|---|---|---|---|---|
| VLAN-ID conversion | | | | 0x000000 |
| VLAN-ID conversion | Start | 1 | 1 | 0x000100 |
| VLAN-ID conversion | End | 1 | 2 | 0x000200 |
| VLAN-ID conversion | VLAN-ID conversion | 1 | 3 | 0x000300 |
| . . . | . . . | . . . | . . . | . . . |

FIG. 15

| Coordination type ID | Coordination content | Argument information | Called instance ID | Called procedure ID |
|---|---|---|---|---|
| 1 | Acquire number of packets received with designated IP address as source | IP address | 5 | 1 |
| 2 | Acquire number of packets transmitted with designated IP address as destination | IP address | 5 | 2 |
| ... | ... | ... | ... | ... |

FIG. 17

| Instance ID | Variable ID | Variable description | Variable value | Possible processes |
|---|---|---|---|---|
| 1 | RX_COUNT | Number of received packets | 1000 | Reference only |
| 1 | TX_COUNT | Number of transmitted packets | 10000 | Reference only |
| 1 | IP_ADDRESS | IP address assigned to bridge | 192.168.1.5 | Reference and update |
| ... | ... | ... | ... | ... |

FIG. 21A

| Row number | Execution instance ID | Execution procedure ID | Return value | Next execution instance ID | Next execution procedure ID |
|---|---|---|---|---|---|
| 1 | START(0) | START(0) | START(0) | 1 | 1 |
| 2 | 1 | 1 | 1 | 2 | 1 |
| 3 | 2 | 1 | 1 | Second packet holding unit(99) | Second packet holding unit(99) |
| 4 | 2 | 1 | 2 | Second packet holding unit(99) | Second packet holding unit(99) |
| 5 | 1 | 1 | -1 | START(0) | START(0) |
| ... | ... | ... | ... | ... | ... |

FIG. 21B

| Row number | Execution instance ID | Execution procedure ID | Return value | Next execution instance ID | Next execution procedure ID |
|---|---|---|---|---|---|
| 1 | START (0) | START (0) | START (0) | 3 | 1 |
| 2 | 3 | 1 | 1 | 4 | 1 |
| 3 | 4 | 1 | 1 | START (0) | START (0) |
| 4 | 1 | 1 | -1 | START (0) | START (0) |
| ... | ... | ... | ... | ... | ... |

COMMUNICATION APPARATUS AND COMMUNICATION METHOD THAT CONTROL PROCESSING SEQUENCE OF COMMUNICATION PACKET

CROSS-REFERENCE TO RELATED APPLICATIONS

This application is a 371 U.S. National Phase of International Application No. PCT/JP2018/004163, filed on Feb. 7, 2018, which claims priority to Japanese Application No. 2017-021382, filed on Feb. 8, 2017. The entire disclosures of the above applications are incorporated herein by reference.

TECHNICAL FIELD

The present invention relates to a communication apparatus and a communication method.

BACKGROUND ART

In recent years, there has been much interest in network function virtualization (NFV), by which the acceleration of the introduction of services can be realized. The concept of NFV is to implement the functions (hereinafter referred to as "NW functions" (network functions)) of communication apparatuses by means of software, which have conventionally been implemented by means of dedicated hardware, and make said NW functions run in operating systems on general-purpose hardware (see, for example, Non-Patent Document 1). NFV makes it possible to add or change NW functions by changing only the software, thus shortening the time required from development of a service to its introduction and deployment.

Additionally, in recent years, service function chaining (hereinafter referred to as "SFC") has also been considered as a technology in which multiple software-implemented NW functions based on the NFV concept are combined in accordance with the services to which a user is subscribed (see, for example, Non-Patent Document 2). In SFC, communication packets (hereinafter also referred to as "packets" from a user pass through the NW functions in a transfer sequence that depends on the subscribed services (see FIG. 24). At the respective NW functions through which the user packets pass, they undergo processing such as header rewriting, discarding, and addition of information. For example, in FIG. 24, a packet is first transferred to NW function 1, where a tag is added thereto, and is then transferred to NW function 2, where said tag is rewritten. In SFC, combinations of NW functions constituting services can be changed by changing the transfer route of the NW functions through which the packet is sent.

PRIOR ART DOCUMENTS

Non-Patent Documents

Non-Patent Document 1: ETSI, "Network Functions Virtualisation—Introductory White Paper", 2012.
Non-Patent Document 2: Hiroyuki KITADA, et al., "Service Function Chaining Technology for Future Networks", NTT Technical journal, 26(5), pp. 10-13, May 2014.

SUMMARY OF INVENTION

Problems to be Solved by the Invention

However, in SFC, there are cases in which communication may be delayed by packet transfer between NW functions. The occurrence of the above-mentioned will be explained by referring to FIG. 25. The respective NW functions operate in virtual environments such as virtual machines or containers. Since different NW functions are run in different software processes, when a packet is to be transferred from a certain NW function (NW function 1) to another NW function (NW function 2), the NW function 1 first writes the packet in a shared memory that is shared by the software processes, and then the NW function 2 reads the packet from the shared memory. At this time, communication may be delayed by the copying of the packet into memory.

In contrast therewith, a method of shortening the time required for the writing process and the reading process by basing the NW functions exchange reference information for a memory address where a packet is located rather than exchanging the packet itself between the NW functions could be considered. However, even with this method, exclusive control between NW functions is required when writing and reading the packets.

In particular, in the case of a process combining many small NW functions, the proportion of the communication delay that is due to packet transfer between NW functions can be expected to be higher than the proportion of the communication delay due to the execution of NW functions. Furthermore, when there are few computing resources in the general-purpose hardware, context switches may frequently occur due to the running of multiple software processes on a single central processing unit (CPU), and there is a concern that this may further increase communication delays.

The present invention was made in consideration of these circumstances, and in particular, has an object of providing a communication apparatus that reduces communication delays when combining multiple NW functions that run on a single unit of general purpose hardware.

Means for Solving the Problems

A first aspect of the present invention is a communication apparatus including: a packet reception unit that receives a communication packet from an external apparatus; a packet transmission unit that transmits the communication packet to another external apparatus after a predetermined process has been executed on the communication packet; and a processing sequence control unit that controls a processing sequence for the communication packet, and the processing sequence control unit includes: a packet holding unit that holds the communication packet; function instances that are generated by respectively converting, into an executable format, function files that include groups of procedures and groups of variables necessary for processing in a communication function, and loading the function files in memory; an instance information management unit that holds instance information including function instance identifiers identifying the function instances, procedure identifiers identifying procedures belonging to the function instances, and memory addresses indicating locations in the memory of the procedures belonging to the function instances: an execution sequence information management unit that holds execution sequence information in which the function instance identifiers, the procedure identifiers, return values of the procedures, and procedures belonging to function instances to be executed next are associated; and a function execution unit that, on the basis of the execution sequence information and the instance information, calls a procedure belonging to a function instance, executes a process based on the procedure belonging to the function instance on the communication packet held in the packet holding unit, and executes a process based on a prefecture belonging to a function instance to be executed next depending on a return value of the process based on the procedure belonging to the function instance.

In the above-described communication apparatus, the processing sequence control unit may include: an external coordination unit that acquires, front an external coordination apparatus, a request to add a communication function, to change a communication function, or to delete a communication function; an execution sequence changing unit that requests the execution sequence information management unit to change an execution sequence in response to an execution sequence change request from the external coordination apparatus; and an instance registration/deletion unit that loads the function instance in the memory or deletes the function instance from the memory in response to the request to add the communication function, to change the communication function, or to delete the communication function, anti the function instance may include: a starting procedure that initializes the function instance; and an ending procedure that performs an ending process.

In the above-described communication apparatus, the function instance may include a notification acceptance procedure that performs a process in response to an information acquisition request and a function execution request from a procedure belonging to another function instance.

In the above-described communication apparatus, the processing sequence control unit may include: a notification procedure that mediates acquisition of information on another function instance and function execution in response to a request from the procedure belonging to the function instance; and a coordination information holding unit that outputs information on a notification acceptance procedure in the other function instance in response to a request from the notification procedure.

In the above-described communication apparatus, the execution sequence information management unit may hold information in a tree structure that is based on an execution sequence and includes, as nodes, memory addresses indicating the locations of the procedures to be executed by the function execution unit, and the function execution unit may execute a procedure by transitioning between the nodes in the tree structure depending on the return values on the basis of the information in the tree structure acquired from the execution sequence information management unit when calling the procedure.

A second aspect of the present invention is a communication method by a computer, the communication method including: a packet reception step in which a packet reception unit receives a communication packet from an external apparatus; a packet transmission step in which a packet transmission unit transmits the communication packet to another external apparatus after a predetermined process has been executed on the communication packet; and a processing sequence control step in which a processing sequence control unit controls a processing sequence for the cos packet, and n umm the processing sequence control step includes: a packet holding step in which a packet holding unit holds the communication packet; a function instance generation step in which a function execution unit generates function instances by respectively converting, into an executable format, function files that include groups of procedures and groups of variables necessary for processing in a communication function, and loading the function files in memory; an instance information management step in which an instance information management unit holds instance information including function instance identifiers identifying the function instances, procedure identifiers identifying procedures belonging to the function instances, and memory addresses indicating locations in the memory of the procedures belonging to the function instances; an execution sequence information management step in which an execution sequence information management unit holds execution sequence information in which the function instance identifiers, the procedure identifiers, return values of the procedures, and procedures belonging to function instances to be executed next are associated; and a function execution step in which the function execution unit, on the basis of the execution sequence information and the instance information, calls a procedure belonging to a function instance, executes a process based on the procedure belonging to the function instance on the communication packet hold in the packet holding unit, and executes a process based on a procedure belonging to a function instance to be executed next depending on a return value of the process based on the procedure belonging to the function instance.

A third aspect of the present invention is a communication apparatus including; procedures belonging to a function instance of a process in communication; and a processing sequence control unit that calls a procedure belonging to a function instance to be executed depending on a procedure belonging to a previously processed function instance and a return value of the procedure belonging to the previously processed function instance.

In the communication apparatus according to the third aspect of the present invention, if the it is no return value, the processing sequence control unit may call, as the procedure belonging to the function instance to be executed, a procedure in accordance with the procedure belonging to the previously processed function instance, a predetermined procedure, or a procedure for performing a predetermined process.

A fourth aspect of the present invention is a communication method by a computer, and the communication method includes: a processing sequence control step in which a procedure belonging to a function instance to be executed is called depending on a procedure belonging to a previously processed function instance of a process in communication and a return value of the procedure belonging to the previously processed function instance.

Advantageous Effects of the Invention

According to the present invention, it is possible to suppress delays occurring within an apparatus.

BRIEF DESCRIPTION OF DRAWINGS

FIG. 4 is a diagram showing an example of an execution sequence rule table held in an execution sequence information management unit in the communication apparatus according to the first embodiment of the present invention.

FIG. 5 is a diagram showing an example of a function instance information table held in an instance information management unit in the communication apparatus according to the first embodiment of the present invention.

FIG. 7 is a diagram showing an example of an execution sequence rule table held in an execution sequence information management unit in the communication apparatus according to modified example 1 of the first embodiment of the present invention.

FIG. 9 is a diagram showing an example of an execution sequence rule table held in an execution sequence information management unit in the communication apparatus according to modified example 2 of the first embodiment of the present invention.

FIG. 12 is a diagram showing an example of instance information generated by a new function instance in the communication apparatus according to the second embodiment of the present invention.

FIG. 15 is a diagram showing an example of a coordination type table held in a coordination information holding unit in the communication apparatus according to the third embodiment of the present invention.

FIG. 17 is a diagram showing an example of a public variable table held in a public variable information holding unit in the communication apparatus according to the modified example of the third embodiment of the present invention.

FIG. 21A is a diagram showing an example of an execution sequence rule table for a function execution unit held in an execution sequence information management unit for the case in which the communication apparatus according to the fifth embodiment of the present invention is pipelined.

FIG. 21B is a diagram showing an example of an execution sequence rule table for a second function execution unit held in the execution a sequence information management unit for the case in which the communication apparatus according to the fifth embodiment of the present invention is pipelined.

MODES FOR CARRYING OUT THE INVENTION

Hereinbelow, embodiments of the present invention will be explained.

The communication apparatuses according to the embodiments of the present invention do not transfer packets between NW functions, and instead realize a combination of multiple NW functions by executing NW functions in accordance with defined sequences without moving the packet data themselves. As a result thereof, in the communication apparatuses according to the embodiments of the present invention, there is no packet transfer between NW functions, thereby suppressing communication delays occurring within the communication apparatuses. Additionally, the communication apparatuses according to the embodiments of the present invention are more effective for suppressing communication delays when many small functions are combined.

Additionally, with the communication apparatuses according to the embodiments of the present invention, as explained below, the NW functions are successively executed according to a defined sequence, so there are no situations in which multiple NW functions simultaneously perform packet reading processes, writing processes, or the like, thus allowing the number of processes requiring exclusive control to be reduced. Furthermore, with the embodiments of the present invention, it is possible to implement the communication apparatuses so that the operation subject executing the respective NW functions is a single software process, allowing the occurrence of communication delays due to context switching to be suppressed in comparison to the case in which the NW functions are respectively implemented by multiple software processes.

The communication apparatuses according to the embodiments of the present invention can make a single unit of general-purpose hardware operate as a virtual communication apparatus by combining multiple NW functions. It is to be noted that the virtual communication apparatus mentioned here may be a core network apparatus or an access network apparatus. The communication apparatuses according to the embodiments of the present invention may, for example, be general-purpose hardware that is made to operate as a virtual optical line terminal (OLT) in an access network by implementing multi-point control protocol (MPCP) functions and/or dynamic bandwidth allocation (DBA) functions as function instances.

[Functional Structure of Communication Apparatus]

Hereinbelow, the functional structure of the communication apparatuses according to the embodiments of the present invention will be explained with reference to the drawings.

Figure 1:
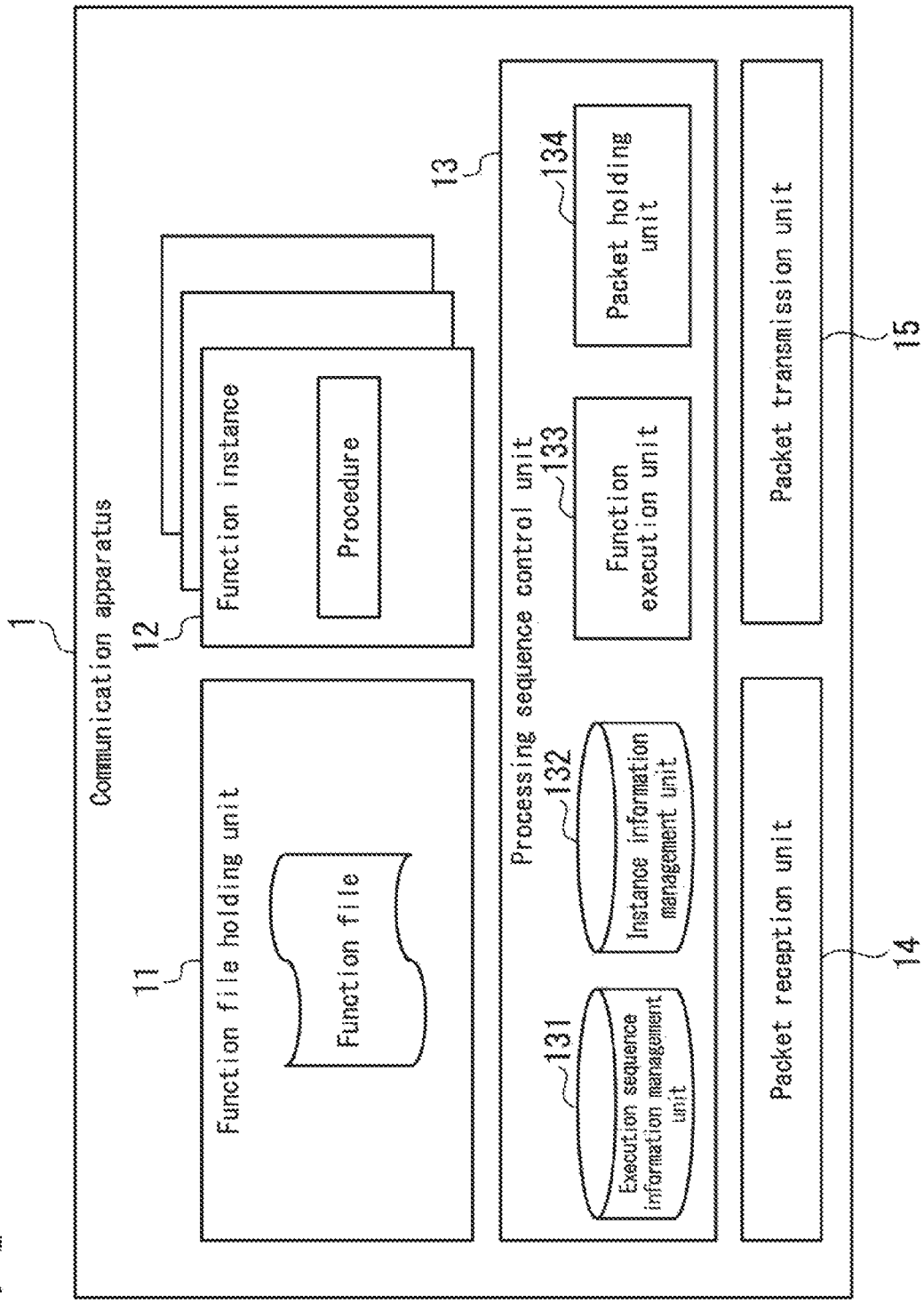
FIG. 1 is a functional block diagram schematically showing the functional structure of a communication apparatus according to the embodiments of the present invention.

FIG. 1 is a functional block diagram schematically showing the functional structure of a communication, apparatus according to the embodiments of the present invention. As illustrated, the communication apparatus 1 is configured so as to include a function file holding unit 11, function instances 12, a processing sequence control unit 13, a packet reception unit 14, and a packet transmission unit 15.

The function file holding unit 11 holds a function file in which the processes of an NW function are written. The function file contains source code describing groups of procedures and groups of variables necessary for the NW function process, or is an executable file that has been compiled or the like.

A function instance 12 is a group of procedures and a group of variables that are loaded in memory (not shown) for each NW function that is combined, after a function file is converted into an executable format.

The packet reception unit 14 receives, from an external apparatus, a packet (communication packet) that has been acquired by the external apparatus. The processing sequence control unit 13 acquires the packet from the packet reception unit 14, calls the procedures of function instances 12 in accordance with a defined sequence, and executes processes regarding NW functions on the acquired packet. After the designated processes have ended, the acquired packet is discarded or sent to the external apparatus (or to another external apparatus) via the packet transmission unit 15.

The processing sequence control unit 13 is configured so as to include an execution sequence information management unit 131, an instance information management unit 132, a function execution unit 133, and a packet holding unit 134.

The execution sequence information management unit 131 holds, as execution sequence information, an execution sequence rule table indicating the execution sequences of processes associated with NW functions. Additionally, the execution sequence information management unit 131 changes the execution sequence rules when there is a request to change the execution sequence, and deletes functions when there is a request to delete specific NW functions.

The instance information management unit 132 holds, as instance information, identifiers (hereinafter referred to as "instance IDs") of function instances that have been loaded in memory, identifiers (hereinafter referred to as "procedure IDs") for identifying the procedures belonging to the respective function instances 12, and memory addresses at which the above-mentioned procedures have been loaded. Additionally, when there are requests to add new function instances 12, requests to delete functions, or requests to replace functions, the instance information management unit 132 adds or deletes information held therein. It is to be noted that the instance information may include not only the memory addresses at which the procedures have been loaded but also information regarding memory addresses at which the function instances have been loaded.

The function execution unit 133 calls a procedure belonging to a function instance 12 on the basis of the above-mentioned instance information and carries out processes on a packet held in the packet holding unit 134. Furthermore, the function execution unit 133. In accordance with the execution sequence indicated by the above-mentioned execution sequence rule table, calls the next procedure depending on a return value of a procedure. It is to be noted that it is possible for there to be no return value for the procedure. Additionally, it is defined that, if the return value is "0", then the packet is to be discarded, and if the return value is smaller than "0" then this represents abnormal termination.

First Embodiment

Hereinbelow, a communication apparatus 1a according to a first embodiment of the present invention will be explained with reference to the drawings. The communication apparatus 1a according to the present embodiment performs transfer by combining multiple NW functions.

Hereinbelow, an example in which the communication apparatus 1a realizes a combination of two functions, i.e., a VLAN-ID conversion function for converting a virtual local area network identifier (VLAN-ID) of a packet and a filter function for discarding packets with specific internet protocol (IP) addresses, will be explained by referring to FIG. 2 to FIG. 5.

Figure 2:
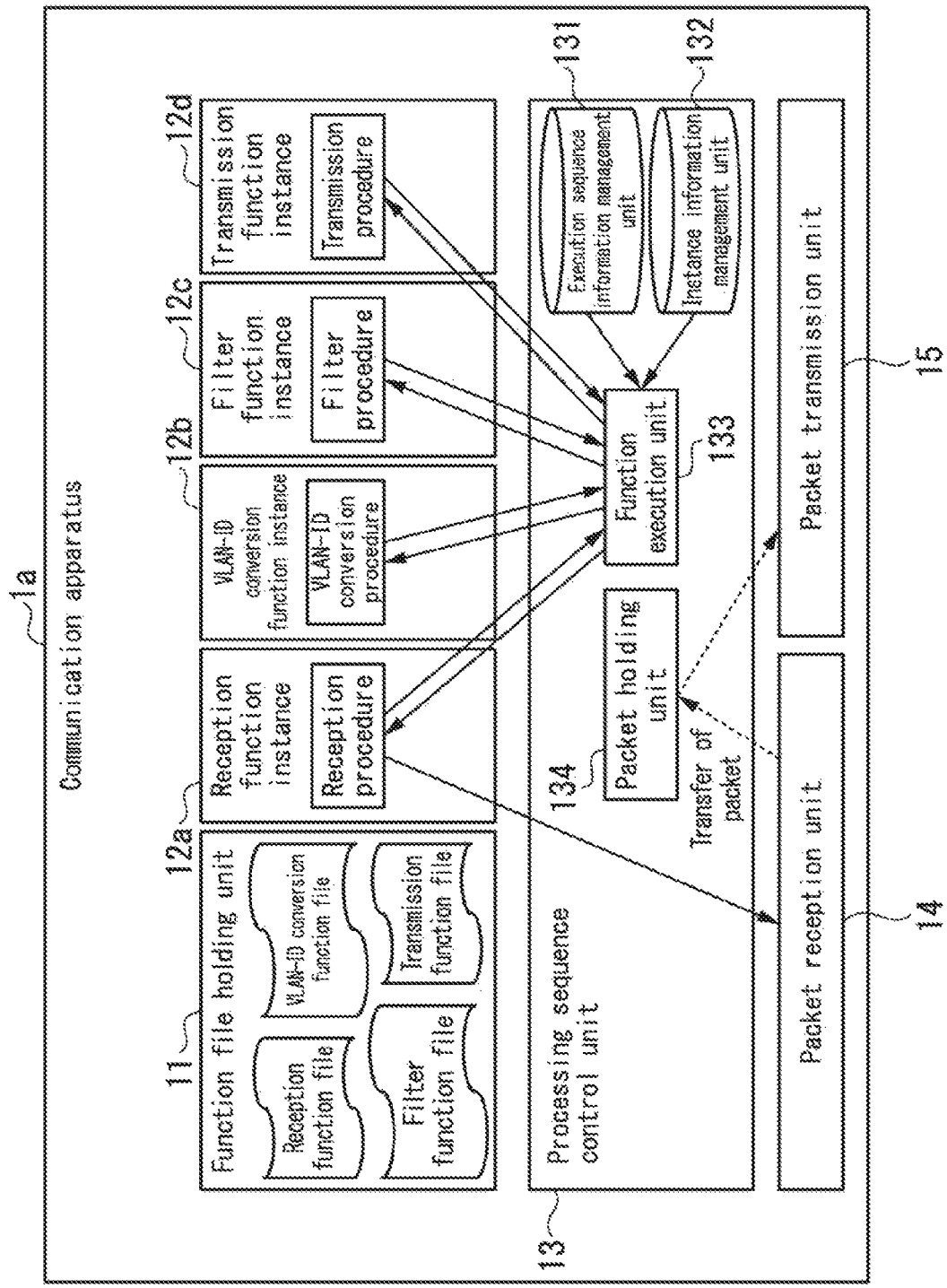
FIG. 2 is a diagram showing an example of a coordination process between functional units when a combination of multiple functions is executed by a communication apparatus according to a first embodiment of the present invention.
Figure 3:
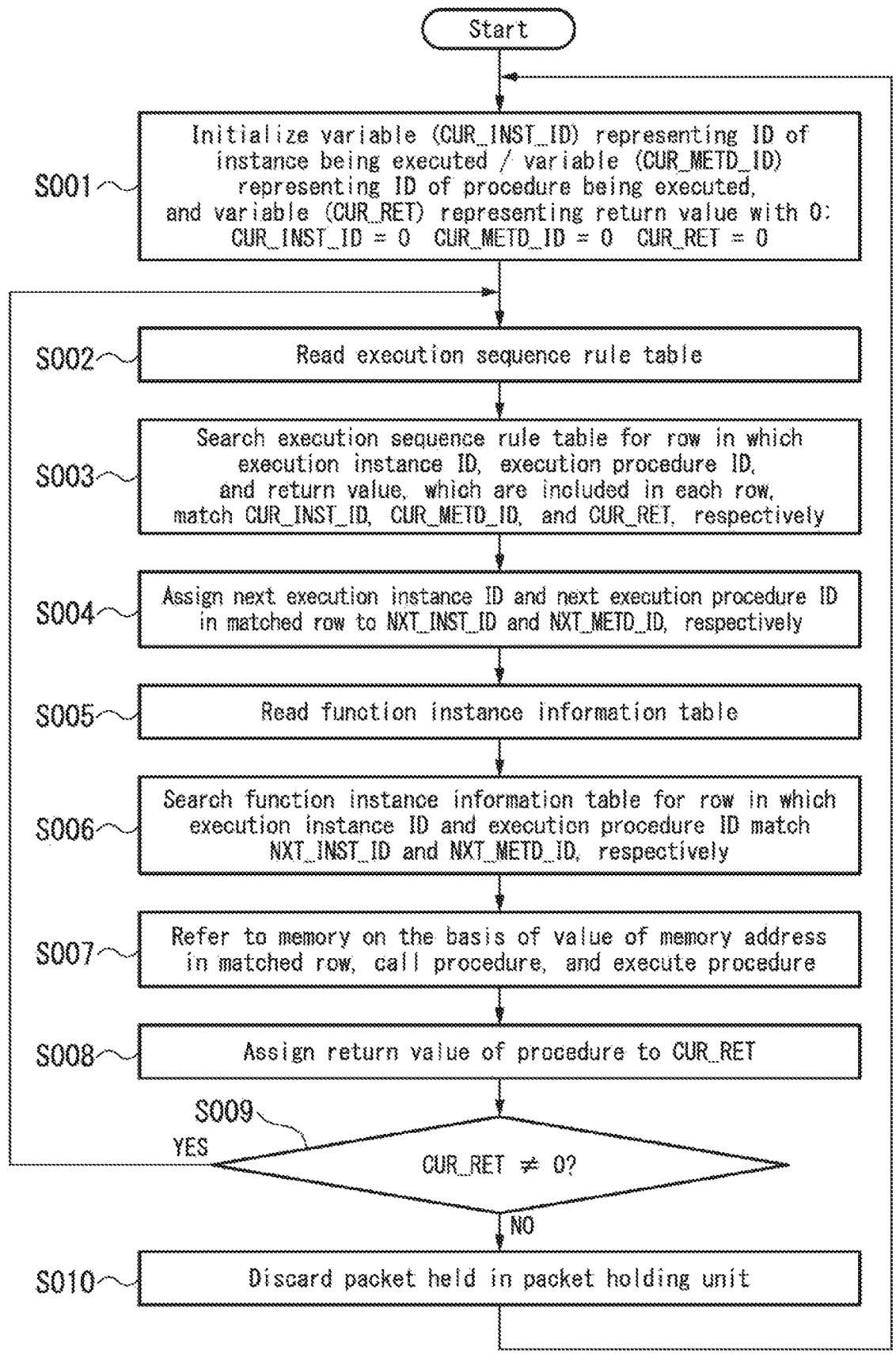
FIG. 3 is a flow chart showing the operations performed by a function execution unit in the communication apparatus according to the first embodiment of the present invention.

FIG. 2 is a diagram showing an example of a coordination process between functional units when a combination of multiple functions is executed by the communication apparatus 1a according to a first embodiment of the present invention. FIG. 3 is a flow chart showing the operations performed by the function execution unit 133 in the communication apparatus 1a according to the first embodiment of the present invention. FIG. 4 is a diagram showing an example of an execution sequence rule table held in the execution sequence information management unit 131 in the communication apparatus 1a according to the first embodiment of die present invention. FIG. 5 is a diagram showing an example of a function instance information table held in the instance information management unit 132 in the communication apparatus 1a according to the first embodiment of the present invention.

As shown in FIG. 2, the function execution unit 133 first acquires the execution sequence rule table from the execution sequence information management unit 131. As shown in FIG. 4, the execution sequence rule table is a table associating an "execution instance ID" for identifying a function instance 12 that is currently being executed, an "execution procedure ID" for identifying a procedure in the function instance 12 that is currently being executed, and a "return value" of the executed process, a "next execution instance ID" for identifying a function instance 12 to be executed next depending on said return value, and a "next execution procedure ID" for identifying a procedure of the function instance 12 to be executed next depending on said return value.

It is to be noted that although not shown in FIG. 4, in cases in which the function instance 12 and the procedure to be executed next are the same regardless of the return value, a "*" may be set as the value in the "return value" category in the execution sequence rule table. Additionally, although not shewn in FIG. 4, "NULL" may be set as the value in the "return value" category in the execution sequence rule table, in order to handle cases in which there is no return value.

Additionally, in cases in which the return value is "0", the function execution unit 133 discards the packet being held in the packet holding unit 134 regardless of the type of function instance 12 being executed.

Additionally, the function instance 12 and the procedure to be executed first are indicated in the first row of the execution sequence rule table, with the value in the "execution instance ID" category being set as "0" (in FIG. 4, indicated as "START (0)"), the value in the "execution procedure ID" category being set as "0" fin FIG. 4, indicated as "START (0)"), and the value in the "return value" category being set as "0" (in FIG. 4, indicated as "START (0)"). It is to be noted that the value in the "return value" category in the first row of the execution sequence rule table could be set to instead of "0".

Next, the function execution unit 133 initializes the variable CUR_INST_ID, which is a variable representing an execution instance ID identifying the function instance 12 that is currently being executed by the function execution unit 133, the variable CUR_METD_ID, which is a variable representing a procedure ID identifying a procedure in the function instance 12 that is currently being executed by the function execution unit 133, and the variable CUR_RET, which is a variable representing the return value of said procedure, by assigning a "0" to each of the variables (FIG. 3, step S001).

Next, the function execution unit 133 reads the execution sequence rule table (FIG. 3, step S002), and starting front the first row in the execution sequence rule table, searches fora row in which the values of the "execution instance ID", the "execution procedure ID", and the "return value", which are included in each row, respectively match the variable CUR_INST_ID, the variable CUR_METD_ID, and the variable CUR_RET (FIG. 3, step S003).

In the execution sequence rule table shown in FIG. 4, the values in the "execution instance ID" category, the "execution procedure ID" category, and the "return value" category in the first row are all "0" (START (0)), and thus respectively match the variable CUR_INST_ID, the variable CUR_METD_ID, and the variable CUR_RET, to each of which "0" is assigned. As a result, the function execution unit 133 assigns the value "1", which is the value in the "next execution instance ID" category, and the value "1", which is the value in the "next execution procedure ID", in the matched row (i.e., in the first row of the execution sequence rule table show n in FIG. 4), respectively to the variable NXT_INST_ID and the variable NXT_METD_ID (FIG. 3, step S004). As a result thereof, the variable NXT_INST_ID=1 and the variable NXT_METD_ID=1.

Next, the function execution unit 133 acquires, from the instance information management unit 132, a function instance information fable indicating the function instance 12 and the procedure that are to be executed next. As shown in FIG. 5, the function instance information talkie is a table associating "function instance names" indicating the names of function instances 12, "procedure names" indicating the names of procedures belonging to the function instances 12, "instance IDs" for identifying the function instances 12, "procedure IDs" for identifying procedures belonging to the function instances 12, and "memory addresses" indicating the locations (addresses) in memory at which the procedures are loaded. It is to be noted that in the function instance information fable, the memory address category for procedures may be left empty. Additionally, although not shown in FIG. 5, the function instance information table may include not only memory addresses for procedures, but also memory addresses for function instances.

The function execution unit 133 reads the function instance information table (FIG. 3, step S005), and starting from the first row in the function instance information table, searches for a row in which the values of the "instance ID" and the "procedure ID", which are included in each row, respectively match the variable NXT_INST_ID, and the variable NXT_METD_ID (FIG. 3, step S006).

In the function instance information table shown in FIG. 5, the values in the "instance ID" and "procedure ID" categories for the function instance 12 (reception function instance) in the second row are both "1", and match the variable NXT_INST_ID and the variable NXT_METD_ID to which "1" is respectively assigned.

The function execution unit 133 acquires "0x000000", which is the value in the "memory address" category in the matched row (i.e., for the function instance 12 (reception function instance) described in the second row). Furthermore, the function execution unit 133 references the acquired memory address in memory, calls the procedure located there, and executes the process (FIG. 3, step S007).

Additionally, the function execution unit 133, when calling the procedure, outputs the memory address in the packet held in the packet holding unit 134 to a reception function instance 12a.

Additionally, the reception procedure in the reception function instance 12a extracts a packet from the packet reception unit 14 and transfers tire packet to the packet holding unit 134. If the packet transfer has been normally performed, the processing of the reception procedure in the reception function instance 12a ends, and a value (an integer greater than "0") representing normal termination is output, as a return value, to the function execution unit 133. It is to be noted that if there is no packet in the packet reception unit 14, the reception procedure in the reception function instance 12a outputs "1" as the return value to the function execution unit 133. Additionally, the value (integer greater than "0") representing normal termination should preferably be a return value that is contained in the execution sequence rule table. This applies not only to the reception function instance 12a but also to other function instances.

The function execution unit 133, upon receiving the return value from the executed procedure in the function instance 12, assigns the return value to the variable CUR_RET (FIG. 3, step S008).

If the return value is "0" (FIG. 3, step S009, NO), the function execution unit 133 discards the packet being hell in the packet holding unit 134 (FIG. 3, step S010) and control returns to the variable initialization step (FIG. 3, step S001). If the return value is something other than "0" (FIG. 3, step S009, YES), then the function execution unit 133 rends the execution sequence rule table again (FIG. 3, step S002), and searches for information indicating the function instance and procedure to be executed next (FIG. 3, step S003).

For example, when the value in the "execution instance ID" category is "1", the value in the "execution procedure ID" category is "1" the reception procedure in the reception function instance 12a as shown in FIG. 5), and the return value is "1", as shown in the second row of the execution sequence rule table in FIG. 4, the function execution unit 133 acquires the value "2" in the "next execution instance ID" category and the value "1" in the "next execution procedure ID" category. On the basis of these values, the function execution unit 133 executes the VLAN-ID conversion procedure in the VLAN-ID conversion function instance 12b, for which the value in the "instance ID"

category is "2" and the value in the "procedure ID" category is "1" in the function instance information table shown in FIG. 5.

The function execution Unit 133 acquires the address "0x000100", which is the memory address of the above-mentioned VLAN-ID conversion procedure, on the basis of the function instance information table, references said memory address in memory, and executes the VLAN-ID conversion procedure.

It is to be noted that the VLAN-ID conversion function instance 12b, for example, holds a list that associates VLAN-IDs before conversion with VLAN-IDs lifter conversion, and rewrites said VLAN-ID in accordance with the VLAN-ID of the packet being held in the packet holding unit 134. When the rewriting of the VLAN-ID ends, the VLAN-ID conversion procedure ends, and the VLAN-ID conversion function instance 12b outputs a return value. Then, the function execution unit 133 acquires the return value from the executed VLAN-ID conversion function instance 12b and assigns said return value to the variable CUR_RET. It is to be noted that at this time, it is possible to change the subsequent process by changing the return value in accordance with the VLAN-ID value.

For example, when the value in the "execution instance ID" category is "2", the value in the "execution procedure ID" category is "1" (i.e., the VLAN-ID conversion procedure in the VLAN-ID conversion function instance 12b as shown in FIG. 5), and the return value is "1", as shown in the third row of the execution sequence rule table in FIG. 4, the function execution unit 133 acquires the value "4" in the "next execution instance ID" category and the value "1" in the "next execution procedure ID" category. On the basis of these values, the function execution unit 133 executes the transmission procedure in the transmission function instance 12d, for which the value in the "instance ID" category is "4" and the value in the "procedure ID" category is "1" in the function instance information table shown in FIG. 5.

The transmission procedure in the transmission function instance 12d transfers, to the packet transmission unit 15, a packet on which predetermined processes have been executed, being held in the packet holding unit 134. As a result thereof, said packet is sent to an external apparatus.

It is to be noted that for the transmission procedure in the transmission function instance 12d, for which the value in the "execution instance ID" category is "4" and the value in the "execution procedure ID" category is "1", as shown in the sixth row in the execution sequence rule table in FIG. 4, a "0" (indicated as "START (0)" in FIG. 4) is set as the value in both the "next execution instance ID" category and the "next execution procedure ID" category.

Additionally, as shown in the first row in the function instance information table in FIG. 5, a dummy function instance and a dummy procedure that are not actually executed are preset such that the values in the "Instance ID" and the "procedure ID" categories are both "0" and the "memory address" category of the procedure is empty ("-"). As a result thereof, in the next searching of the execution sequence rule table, the first row in the execution sequence rule table shown in FIG. 4 will be retrieved, thereby starting the packet reception process again.

On the other hand, for example, when the value in the "execution instance ID" category is "2", the value in the "execution procedure ID" category is "1" (i.e., the VLAN-ID conversion procedure in the VLAN-ID conversion function instance 12b as shown in FIG. 5), and the return value is "2", as shown in the fourth row of the execution sequence rule table in FIG. 4, the function execution unit 133 acquires the value "3" in the "next execution instance ID" category and the value "1" in the "next execution procedure ID" category. On the basis of these values, the function execution unit 133 executes a filter procedure in a filter function instance 12c, for which the value in the "instance ID" category is "3" and the value in the "procedure ID" category is "1" in the function instance information table shown in FIG. 5.

The filter function instance 12c, for example, holds a list of IP addresses of filter targets. The filter procedure in the filter function instance 12c acquires the IP address of the packet being held in the packet holding unit 134, and if said IP address is included in the above-mentioned list, outputs "0" as the return value to the function execution unit 133, and the function execution unit 133 discards the packet being held in the packet holding unit 134. If the return value is "1", the function execution unit 133 searches the execution sequence rule table and executes a transmission procedure in the transmission function instance 12d, for which the value in the "instance ID" category is "4" and the value in the "procedure ID" category is "1".

As mentioned above, the values in the "instance ID" and "procedure ID" categories that correspond to the function instance and the procedure that are to be executed (which are a dummy function instance and a dummy procedure and are thus not actually executed) following the transmission procedure are "0", so the packet reception process is started again.

As explained above, the communication apparatus 1a according to the first embodiment of the present invention can successively execute various procedures belonging to NW functions on the basis of the execution sequence defined by the execution sequence rule table and determine the procedure to be executed next depending on the return value of the executed procedure. For such successive processes, there is no need for any processes for transferring packets between NW functions as in the conventional art. As a result thereof, the communication apparatus 1a according to the first embodiment of the present invention is able to suppress the occurrence of delays due to the transferring of packets between NW functions. Additionally, in the communication apparatus 1a according to the first embodiment of the present invention, each function is successively executed, so there is no need to exclusively control the packets and, for example, the apparatus can be simplified.

Modified Example 1 of First Embodiment

Figure 6:
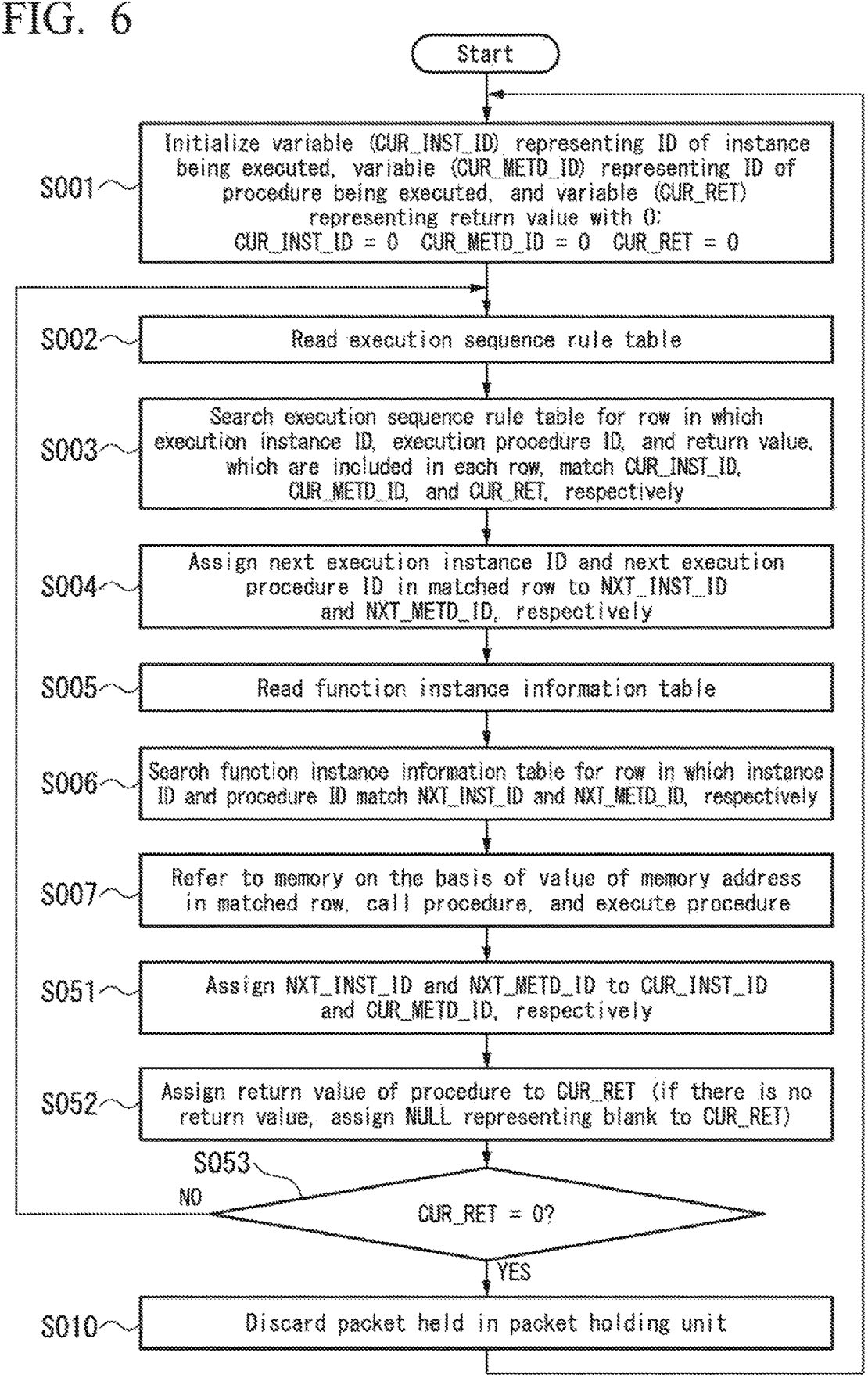
FIG. 6 is a flow chart showing the operations performed by a function execution unit in the communication apparatus according to modified example 1 of the first embodiment of the present invention.

Hereinbelow, a communication apparatus according to modified example 1 of the first embodiment of die present invention will be explained. The structure of the communication apparatus according to the present modified example is basically the same as the structure of the communication apparatus 1a according to the first embodiment, but the operations performed by the function execution unit 133 and the execution sequence rule table are different front those in the first embodiment. FIG. 6 is a flow chart showing the operations performed by the function execution unit 133 in the communication apparatus 1a according to the present modified example. FIG. 7 is a diagram showing an example of an execution sequence rule table held in the execution sequence information management unit 131 in the communication apparatus 1a according to the present modified example.

As shown in FIG. 2, the function execution unit 133 first acquires an execution sequence rule table from the execution sequence information management unit 131.

It is to be noted that in cases in which the function instance 12 and the procedure to be executed next are the same regardless of the return value, a "*" may be set as the value in the "return value" category in the execution sequence rule table. Additionally, although not shown in FIG. 7, "NULL" may be set as the value in the "return value" category in the execution sequence rule table in order to handle cases in which there is no return value.

Additionally, in cases in which the return value is "0", the function execution unit 133 discards the packet being held in the packet holding unit 134 regardless of the type of function instance 12 being executed.

Additionally, the function instance 12 and the procedure to be executed first are indicated in the first row of the execution sequence rule table, with the value in the "execution instance ID" category being set as "0" (in FIG. 7, indicated as "START (0)"), the value in the "execution procedure ID" category being set as "0" (in FIG. 7, indicated as "START (0)"), and the value in the "return value" category being set as "*".

Next, the function execution unit 133 initializes the variable CUR_INST_ID, the variable CUR_METD_ID, and the variable CUR_RET by assigning a "0" to each of the variables (FIG. 6, step S001).

Next, the function execution unit 133 reads the execution sequence rule table (FIG. 6, step S002), and starting from the first row in the execution sequence rule table, searches for a row in which the values of the "execution instance ID" category, the "execution procedure ID" category, and the "return value" category, which are included in each row, respectively match the variable CUR_INST_ID, the variable CUR_METD_ID, and the variable CUR_RET (FIG. 6, step S003).

In the execution sequence rule table shown in FIG. 7, the values in the "execution instance ID" category, the "execution procedure ID" category, and the "return value" category in the first row are respectively "0" (START (0)), "0" (START (0)), and "*", and thus respectively match the variable CUR_INST_ID, the variable CUR_METD_ID, and the variable CUR_RET, to each of which "0" is assigned. As a result, the function execution unit 133 assigns the value "1" which is the value in the "next execution instance ID" category, and the value "1" which is the value in the "next execution procedure ID", in the matched row (i.e., in the first row of the execution sequence ride table shown in FIG. 7), respectively to the variable NXT_INST_ID and the variable NXT_METD_ID (FIG. 6, step S004). As a result thereof, the variable NXT_INST_ID-1 and the variable NXT_METD_ID-1.

Next, the function execution unit 133 acquires, from the instance information management unit 132, a function instance information table indicating the function instance 12 and (lie procedure that are to be executed next.

The function execution unit 133 reads the function instance information table (FIG. 6, step S005), and starting from the first row in the function instance information table, searches for a row in which the values of the "instance ID" and the "procedure ID", which are included in each row, respectively match the variable NXT_INST_ID and the variable NXT_METD_ID (FIG. 6, step S006).

In the function instance information table shown in FIG. 5, the values in the "instance ID" and "procedure ID" categories for the function instance 12 (reception function instance) in the second row are both "1", and match the variable NXT_INST_ID and the variable NXT_METD_ID to which "1" is respectively assigned.

The function execution unit 133 acquires "0x000000", which is the value in the "memory address" category in the matched row (i.e., the function instance 12 (reception function instance) described in the second row). Furthermore, the function execution unit 133 references the acquired memory address in memory, calls the procedure located there, anti executes the process (FIG. 6, step S007).

Additionally, the function execution unit 133, when calling the procedure, outputs the memory address in the packet held in the packet holding unit 134 to the reception function instance 12*a*.

Additionally, the reception procedure in the reception function instance 12*a* extracts a packet from the packet reception unit 14 and transfers the packet to the packet holding unit 134. If the packet transfer has been normally performed, the processing of the reception procedure in the reception function instance 12*a* ends, and a value (an integer greater than "0") representing normal termination is output, as a return value, to the function execution unit 133. It is to be noted that if there is no packet in the packet reception unit 14, the reception procedure in the reception function instance 12*a* outputs "−1" as the return value to the function execution unit 133. Additionally, the value (integer greater than "0") representing normal termination should preferably be a return value that is contained in the execution sequence rule table. This applies not only to the reception function instance 12*a* but also to other function instances.

Next, the function execution unit 133 assigns the values of the variable NXT_INST_ID and the variable NXT_METD_ID to the variable CUR_INST_ID and the variable CUR_METD_ID (FIG. 6, step S051).

The function execution unit 133, upon receiving the return value from the executed procedure in the function instance 12, assigns the return value to the variable CUR_RET (FIG. 6, step S052). It Ls to be noted that if there is no return value, then the function execution unit 133 assigns "NULL" to the variable CUR_RET.

If the return value is "0" (FIG. 6, step S053, YES), the function execution unit 133 discards the packet being held in the packet holding unit 134 (FIG. 6, step S010) and control returns to the variable initialization step (FIG. 6, step S001). If the return value is something other than "0" (FIG. 6, step S053, NO), then the function execution unit 133 reads the execution sequence rule table again (FIG. 6, step S002), and searches for information indicating the function instance and procedure to be executed next (FIG. 6, step S003).

For example, when the value in the "execution instance ID" category is "1", the value in the "execution procedure ID" category is "1" (i.e., the reception procedure in the reception function instance 12*a* as shown in FIG. 5), and the return value is "1", as shown in the second row of the execution sequence rule table in FIG. 7, the function execution unit 133 acquires the value "2" in the "next execution instance ID" category and the value "1" in the "next execution procedure ID" category. On the basis of these values, the function execution unit 133 executes the VLAN-ID conversion procedure in the VLAN-ID conversion function instance 12*b*, for which the value in the "instance ID" category is "2" and the value in the "procedure ID" category is "1" in the function instance information table shown in FIG. 5.

The function execution unit 133 acquires "0x000100", which is the memory address of the above-mentioned VLAN-ID conversion procedure, on the basis of the function instance information table, references said memory address in memory, and executes the VLAN-ID conversion procedure.

It is to be noted that the VLAN-ID conversion function instance 12b, for example, holds a list that associates VLAN-IDs before conversion with VLAN-IDs after conversion and rewrites said VLAN-ID in accordance with the VLAN-ID of the packet being held in the packet holding unit 134. When the rewriting of the VLAN-ID ends, the VLAN-ID conversion procedure ends, and the VLAN-ID conversion function instance 12b outputs a return value. Then, the function execution unit 133 acquires the return value from the executed VLAN-ID conversion function instance 12b and assigns said return value to the variable CUR_RET. It is to be noted that at this time, it is possible to change the subsequent process by changing the return value in accordance with the VLAN-ID value.

For example, when the value in the "execution instance ID" category is "2", the value in the "execution procedure ID" category is "1" (i.e., the VLAN-ID conversion procedure in the VLAN-ID conversion function instance 12b as shown in FIG. 5), and the return value is "1", as shown in the third row of the execution sequence rule table in FIG. 7, the function execution unit 133 acquires the value "4" in the "next execution instance ID" category and the value "1" in the "next execution procedure ID" category. On the basis of these values, the function execution unit 133 executes the transmission procedure in the transmission function instance 12d, for which the value in the "instance ID" category is "4" and the value in the "procedure ID" category is "1" in the function instance information table shown in FIG. 5.

The transmission procedure in the transmission function instance 12d transfers, to the packet transmission unit 15, a packet on which predetermined processes have been executed, being held in the packet holding unit 134. As a result thereof, said packet is sent to an external apparatus.

It is to be noted that for the transmission procedure in the transmission function instance 12d, for which the value in the "execution instance ID" category is "4" and the value in the "execution procedure ID" category is "1", as shown in the sixth row in the execution sequence rule table in FIG. 7, a "0" (indicated as "START (0)" in FIG. 1) is set as the value in both the "next execution instance ID" category and the "next execution procedure ID" category.

Additionally, as show n in the first row in the function instance information table in FIG. 5, a dummy function instance and a dummy procedure that are not actually executed are preset such that the values in the "instance ID" category and the "procedure ID" category are both "0" and the "memory address" category of the procedure is empty ("-"). As a result thereof, in the next searching of the execution sequence rule table, the first row the execution sequence rule table shown in FIG. 7 will be retrieved, thereby starting the packet reception process again.

On the other hand, for example, when the value in the "execution instance ID" category is "2", the value in the "execution procedure ID" category is "1" (i.e., the VLAN-ID conversion procedure in the VLAN-ID conversion function instance 12b as shown in FIG. 5), and the return value is "2", as shown in the fourth row of the execution sequence rule table an FIG. 7, the function execution unit 133 acquires the value "3" in the "next execution instance ID" category and the value "1" in the "next execution procedure ID" category. On the basis of these values, the function execution unit 133 executes the filter procedure in the filter function instance 12c, for which the value in the "instance ID" category is "3" and the value in the "procedure ID" category is "1" in the function instance information table shown in FIG. 5.

The tiller function instance 12c, for example, holds a list of IP addresses of filter targets. The filter procedure in the filler function instance 12c acquires the IP address of the packet being held in the packet holding unit 134, and if said IP address is included in the above mentioned list, outputs "0" as the return value to the function execution unit 133, and the function execution unit 133 discards the packet being held in the packet holding unit 134. If the return value is "1", the function execution unit 133 searches the execution sequence rule table and executes the transmission procedure in the transmission function instance 12d, for which the value in the "instance ID" category is "4" and the value in the "procedure IP" category is "1".

As mentioned above, the values in the "instance ID" and "procedure ID" categories that correspond to the function instance and the procedure that are to be executed (which are a dummy function instance and a dummy procedure and are thus not actually executed) following the transmission procedure are "0", so the packet reception process is started again.

It is to be noted that if a value lower than "0" is contained as a return value in the execution sequence rule table, as shown in the seventh row in FIG. 7, it is also possible to describe the execution of abnormal processes in the case of abnormal termination.

Additionally, in the above description, an example in which a packet is transferred from the packet reception unit 14 to the packet holding unit 134 by executing a reception procedure is described. However, as soon as the packet reception unit 14 receives a packet, the received packer may be automatically transferred to the packet holding unit 134. In this case, the processing sequence control unit 13 does not always execute the sequence shown in FIG. 6, and the operations in the sequence are started by interruption or the like as soon as a packet arrives at the packet holding unit 134. According to this method, the power efficiency and the like are expected to increase in comparison to the previously described method.

Modified Example 2 of First Embodiment

Hereinbelow, a communication apparatus according to modified example 2 of the first embodiment of the present invention will be explained. In the above-described first embodiment, each row of the execution sequence rule table basically has a return value, and execution is possible in a different processing sequence depending on the return value. However, it is also possible to eliminate the return values and perform predetermined processes sequentially.

The structure of the communication apparatus according to the present modified example is basically the same as the structure of the communication apparatus 1a according to the first embodiment, and the structure of the execution sequence title table and the operations performed by the function execution unit 133 are different from those in the first embodiment.

Figure 8:
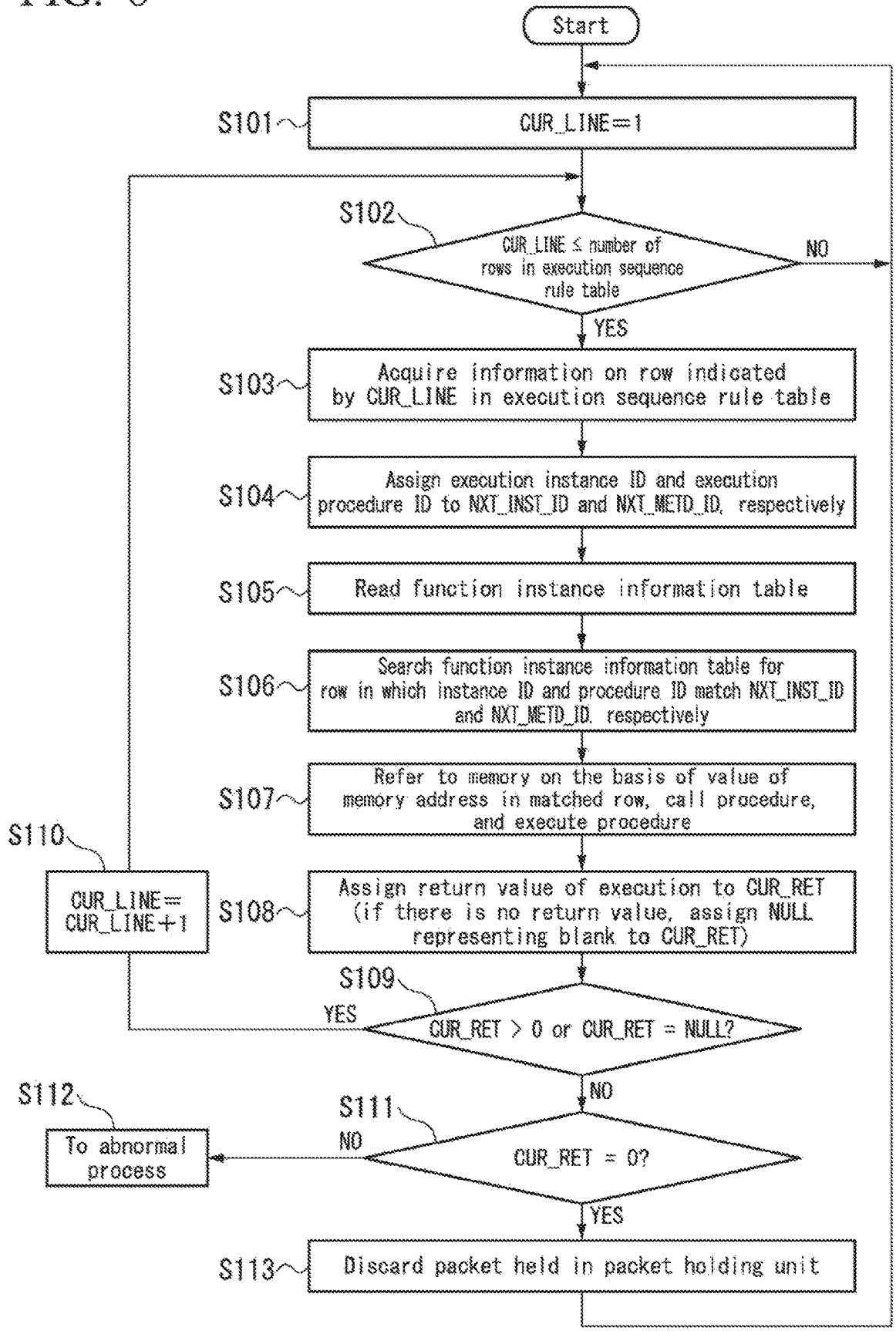
FIG. 8 is a flow chart showing the operations performed by a function execution unit in the communication apparatus according to modified example 2 of the first embodiment of the present invention.

FIG. 8 is a flow chart showing the operations performed by the function execution unit 133 in the communication apparatus 1a according to the present modified example. FIG. 9 is a diagram showing an example of an execution sequence rule table held in the execution sequence information management unit 131 in the communication apparatus 1a according to the present modified example.

As shown in FIG. 9, the execution sequence rule table according to the present modified example is a table that associates an "execution instance ID" for identifying a function instance 12 that is currently being executed with an "execution procedure ID" for identifying a procedure in the function instance 12 that is currently being executed.

Hereinbelow, the operations of the communication apparatus 1a according to the present modified example will be explained. First, the function execution unit 133 assigns "1" to the variable CUR_LINE, which represents the row, in the execution sequence rule table, of the procedure currently being executed, thereby initializing the variable CUR_LINE (FIG. 8, step S101). Next, the function execution unit 133 determines whether or not the variable CUR_LINE is equal to or less than the number of rows ("4" in the example in FIG. 9) in the execution sequence rule table (FIG. 8, step S102). In this case, the variable CUR_LINE is equal to "1", which is less than the number of rows in the execution sequence rule table (FIG. 8, step S102, YES). Thus, the function execution unit 133 advances the process to step S103.

Subsequently, the function execution unit 133 acquires information on the row in the execution sequence rule table indicated by the variable CUR_LINE (FIG. 8, step S103), and assigns the execution instance ID and the execution procedure ID that are described in the first row, respectively, to the variables NXT_INST_ID and NXT_METD_ID (FIG. 8, step S104). Subsequently, the function execution unit 133 reads the function instance information table as in the first embodiment (FIG. 8, step S105). Next, the function execution unit 133 searches the function instance information table for a row in which the values of the instance ID and the procedure ID respectively match the variable NXT_INST_ID and the variable NXT_METD_ID (FIG. 8, step S106).

Next, the function execution unit 133 references, in memory, the value of the memory address in the matched row, calls the procedure located there, and executes the process (FIG. 8, step S107). When this process ends and a return value is received from the procedure for which the function execution unit 133 executed a process, the function execution unit 133 assigns said return value to the variable CUR_RET (FIG. 8, step S108). It is to be noted that if there is no return value, the function execution unit 133 assigns "NULL", which represents a blank, to the variable CUR_RET.

Next, the function execution unit 133 determines if the variable CUR_RET is a value greater than "0" or "NULL" (FIG. 8, step S109). If the variable CUR_RET is a value greater than "0" or "NULL" (FIG. 8, step S109, YES), then the function execution unit 133 assumes that the procedure has been executed normally and advances to the processing in the next procedure. Thereafter, the function execution unit 133 increments the variable CUR_LINE by one (FIG. 8, step S110). As a result thereof, the variable CUR_LINE becomes "2".

Next, the function execution unit 133 determines whether or not the variable CUR_LINE is equal to or less than the number of rows in the execution sequence rule table (FIG. 8, step S102) as mentioned above. In this case also, the variable CUR_LINE is equal to "2", which is less than the number of rows in the execution sequence rule table, so the function execution unit 133 advances the process to step S103, and as above, calls the procedure of the function instance that corresponds to the execution instance ID and the execution procedure ID described in the second row of the execution sequence rule table.

If the return values of the called procedures are all values greater than "0" or "NULL", then the above operations are performed on all of the rows in the execution sequence rule table. Then, after the processing for the procedure corresponding to the fourth row in the execution sequence rule table has ended, the variable CUR_LINE is incremented by one in step S110 and thus becomes "5". In this case, the variable CUR_LINE is greater than the number of rows in the execution sequence rule table (FIG. 8, step S102, NO), so the function execution unit 133 assumes that the procedures to be executed have ended, returns control to step S101, initializes the variable CUR_LINE to "1", and starts the execution from the top of the execution sequence.

On the other hand, if it is determined, during the operations in any of the procedures, that the variable CUR_RET is not a value greater than "0" and not "NULL" (FIG. 8, step S109, NO), then the function execution unit 133 determines whether or not the variable CUR_RET is "0" (FIG. 8, step S111). If the variable CUR_RET is not "0" (FIG. 8, step S111, NO), then the variable CUR_RET is less than "0" because the result of the determination in step S109 indicates that the variable CUR_RET is not greater than "0". In this case, the function execution unit 133 assumes that an abnormality has occurred, and shifts to a process (abnormal process) for handling abnormalities (FIG. 8, step S112). On the other hand, if the variable CUR_RET is "0" (FIG. 8, step S111, YES), then the function execution unit 133 discards the packet being held in the packet holding unit 134 (FIG. 8, step S113), returns control to step S101, initializes the variable CUR_LINE to "1", and starts execution from the top of the execution sequence.

In the present modified example, the processing is not changed depending on the return value, but it becomes unnecessary to search the execution sequence rule table, so high-speed processing can be expected.

Second Embodiment

Hereinbelow, a communication apparatus 1b according to a second embodiment of the present invention will be explained. In the communication apparatus 1b according to the present embodiment, the functions of adding new NW functions, deleting existing functions, and replacing existing functions with new functions are added to the above-described communication apparatus in according to the first embodiment.

Figure 10:
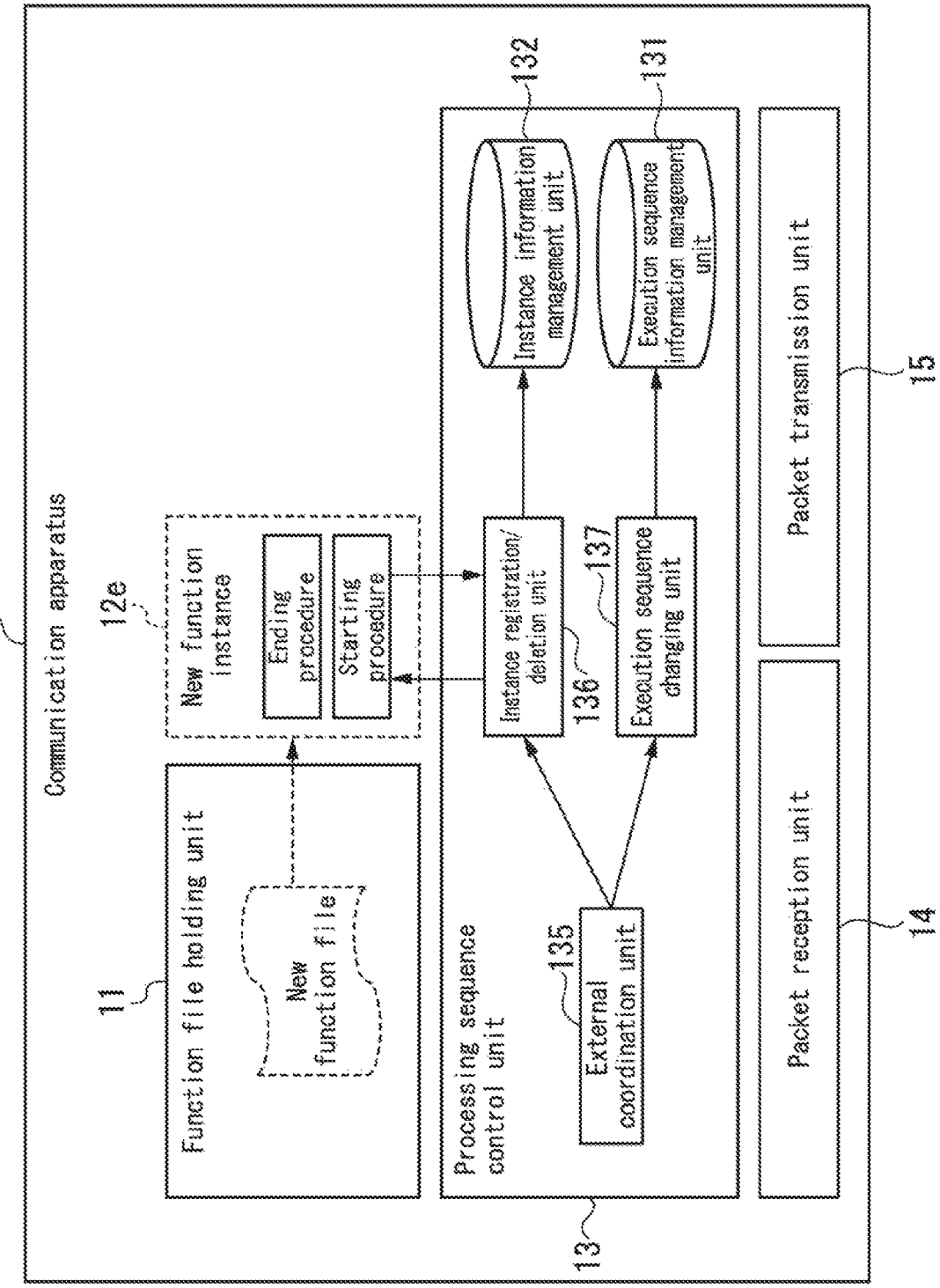
FIG. 10 is a diagram showing an example of the operations performed when adding a function to the communication apparatus according to a second embodiment of the present invention.
Figure 11:
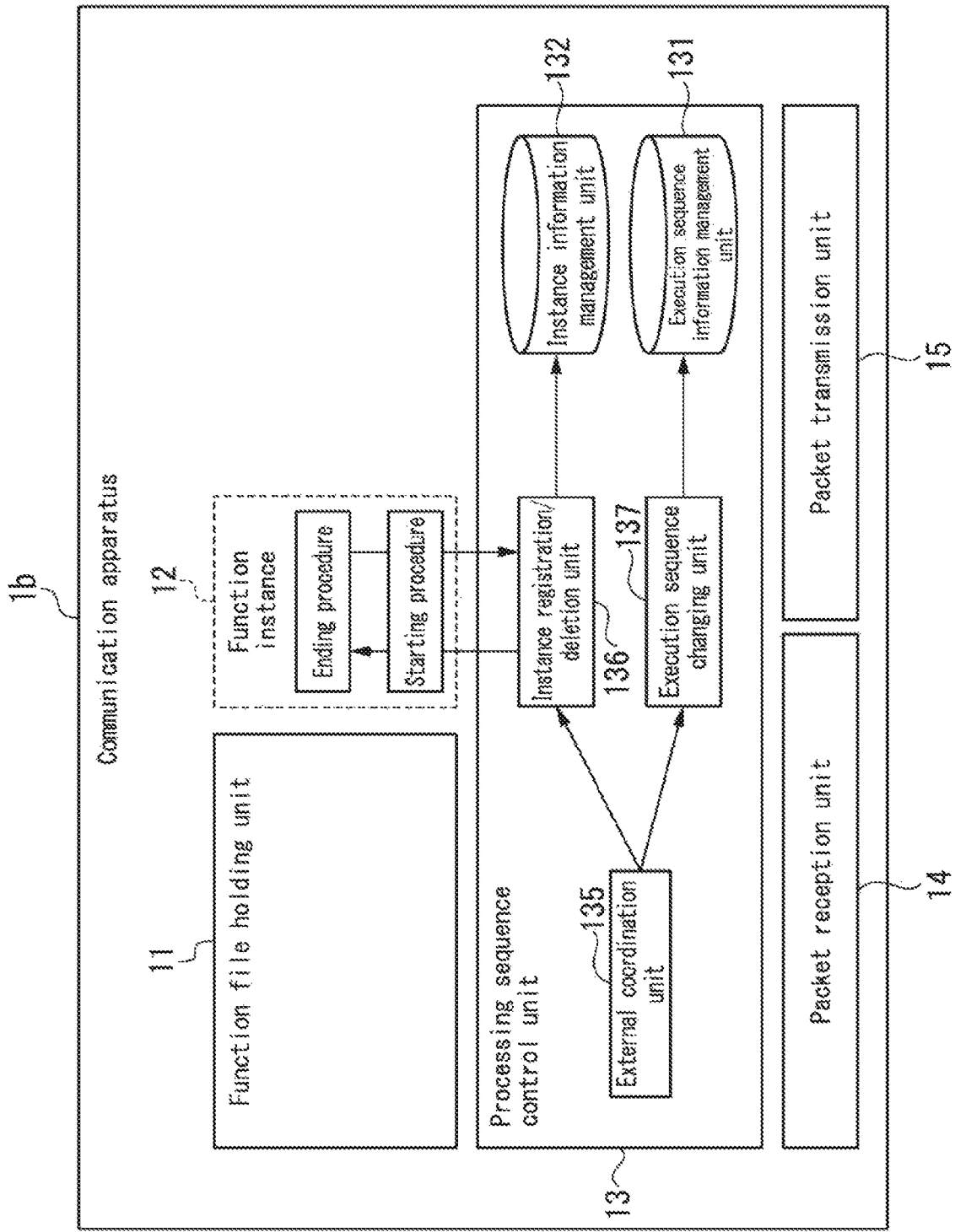
FIG. 11 is a diagram showing an example of the operations performed when deleting a function from the communication apparatus according to the second embodiment of the present invention.

Hereinbelow, the operations in the communication apparatus 1b according to the present embodiment will be explained with reference to the drawings. FIG. 10 is a diagram showing an example of the operations when adding functions to the communication apparatus 1b according to the second embodiment of the present invention. FIG. 11 is a diagram showing an example of the operations when deleting functions from the communication apparatus 1b according to the second embodiment of the present invention.

As illustrated in FIG. 10 and FIG. 11, the communication apparatus 1b according to the second embodiment differs from the above-described communication apparatus 1a according to the first embodiment in that an external coordination unit 135, an instance registration/deletion unit 136, and an execution sequence changing unit 137 are further provided in the processing sequence control unit 13. It is to be noted that in FIG. 10 and FIG. 11, the function execution unit 133, the packet holding unit 134, the reception function file, the VLAN-ID function file, the filter function file, the transmission file, the reception function instance 12a, the VLAN-ID conversion function instance 12b, the filler function instance 12c, and the transmission function instance 12d are omitted from the illustration.

The external coordination unit 135 acquires a request to add a communication function, to change a communication function, or to delete a communication function from an external coordination apparatus.

As illustrated in FIG. 10, for example, when an administrator or the tike of the communication apparatus 1b is to add a new function instance, a new function file, which is a function file for a new function, an instance ID for the new function, and information indicating a method of changing the execution sequence are set in the external coordination unit 135 on the basis of the above-mentioned request to add a communication function.

The external coordination unit 135 outputs, to the instance registration/deletion unit 136, information indicating the request to add a function, the new function file, and an instance ID for identifying a new function instance 12e, winch is an instance 12 for the new function that has been newly generated. The instance registration/deletion unit 136 saves the new function file that has been acquired in a function file holding unit 11 and loads the function file in memory. It is to be noted that all of the function instances have a starting procedure and an ending procedure. When the new function file is loaded in memory, the instance registration/deletion unit 136 acquires the memory address of the above-mentioned starting procedure.

After the new function file has been loaded in memory, the instance registration/deletion unit 136 executes the starting procedure of the new function instance 12e on the basis of the acquired memory address of the starting procedure to initialize the new function instance 12e. After the starting procedure is called, the new function instance 12c acquires its own memory address, procedure IDs of procedures being held by the new function instance 12e, and the memory addresses of the respective procedures, and generates instance information. For example. FIG. 12 is a diagram showing an example of instance information generated by the new function instance 12e of the communication apparatus 1b according to the second embodiment of the present invention.

The new function instance 12c outputs the generated instance information to the instance registration/deletion unit 136. The instance registration/deletion unit 136 outputs the acquired instance information, together with the instance ID, to the instance information management unit 132. The instance information management unit 132 writes the acquired instance information in the function instance information table that is held therein.

Figure 13:
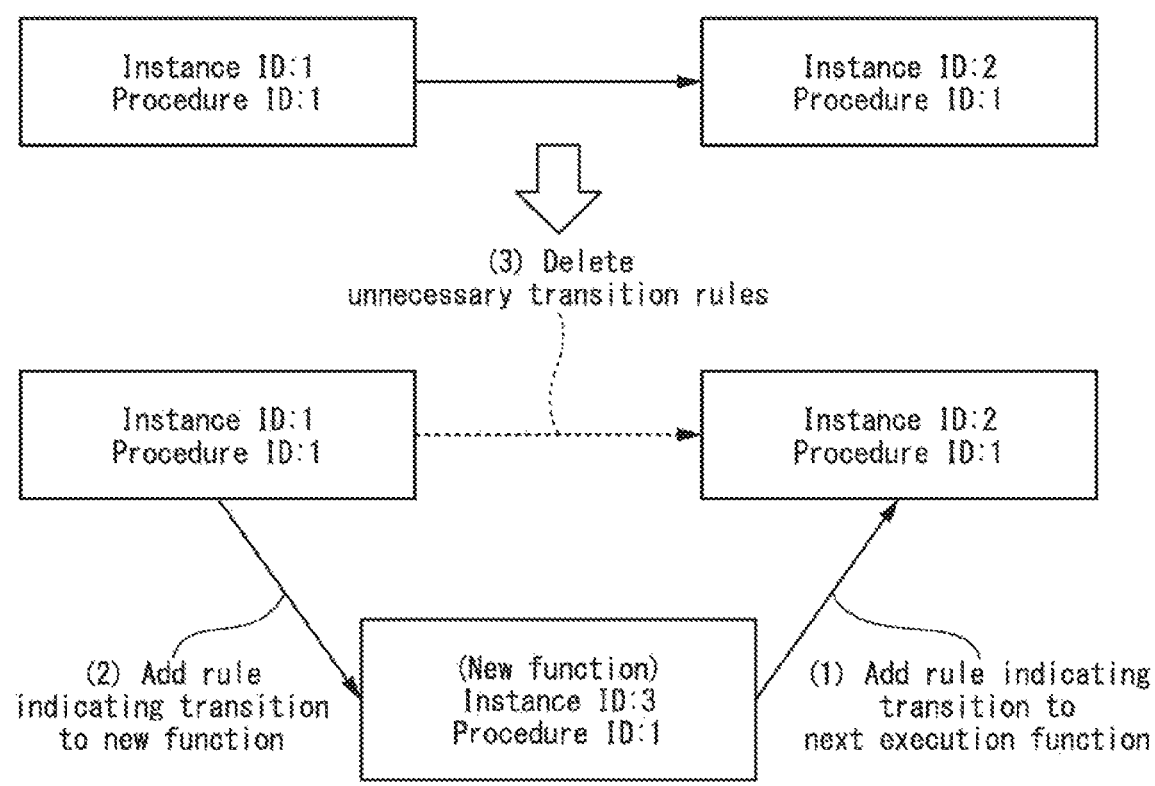
FIG. 13 is a diagram showing an example of an execution sequence changing method performed by the communication apparatus according to the second embodiment of the present invention.

After the above-mentioned writing of the instance information has been completed in the instance information management unit 132, the external coordination unit 135 outputs the information indicating a method of changing the execution sequence set by the administrator or the like, together with an execution sequence change request, to the execution sequence changing unit 137. The execution sequence changing unit 137 outputs a request to change the execution sequence rale table held in the execution sequence information management unit 131 on the basis of the acquired information indicating the method of changing the execution sequence. As shown in FIG. 13, for example, when a function is added, the execution sequence changing unit 137 requests the execution sequence rule table in the execution sequence information management unit 131 to add a rule indicating a transition from the new function to an existing function (1), to add a rule indicating a transition to the new function (2), and finally, to delete the unnecessary rule (3).

As illustrated in FIG. 11, for example, when an administrator or the like of the communication apparatus 1b is to delete a function instance 12, an instance ID identifying the function instance 12 to be deleted, and information indicating a method of changing the execution sequence are set in the external coordination unit 135. The external coordination unit 135 first outputs the information indicating the method of changing the execution sequence to the execution sequence changing unit 137.

The execution sequence changing unit 137, on the basis of the acquired information indicating the method of changing the execution sequence, updates the execution sequence rule table held in the execution sequence information management unit 131 in a manner similar to that used when adding the new function instance 12e. When the updating of the execution sequence rule table in the execution sequence information management unit 131 has been completed, the external coordination unit 135 outputs, to the instance registration/deletion unit 136, the instance ID of the function instance to be deleted, together with a function deletion request. The instance registration/deletion unit 136 acquires, from the instance information management unit 132, the memory address of the function instance 12 to be deleted, and the memory address of the ending procedure for the function instance 12.

Thereafter, the instance registration/deletion unit 136 calls the ending procedure of the function instance 12 to be deleted. In the ending procedure of the function instance 12, after the processes necessary for ending the function (ending processes) have been performed, a notification of a deletion request is output to the instance registration/deletion unit 136. The instance registration/deletion unit 136, upon receiving the notification of the deletion request from the function instance 12, deletes the function instance 12 that has been loaded in memory, and requests the instance information management unit 132 to delete the information of the function instance 12 to be deleted. Upon acquiring the deletion request, the instance information management unit 132 deletes, from the function instance information table that is held therein, the row that is associated with the instance ID of the function instance 12 to be deleted.

It is possible not only to add and delete functions but also to replace existing functions with new functions. For example, when an administrator or the like of the communication apparatus 1b is to replace an existing function instance with a new-function instance, a new function file, which is the function file for the new function, and the instance ID of an existing function that is to be replaced are set in the external coordination unit 135. The external coordination unit 135 outputs a notification of a function replacement request to the instance registration/deletion unit 136. The instance registration/deletion unit 136 performs the above-mentioned function addition process. At this lime, the procedure differs from that when adding a function in that the instance information management unit 132 overwrites the memory address value of the existing function instance information in the function instance information table with the memory address value of the new function instance information. Additionally, an execution sequence rule table updating process is not performed. After the updating process of the function instance information table has ended, the instance registration/deletion unit 136 calls the ending procedure of the existing function instance, and the function instance loaded in memory is deleted.

As described above, the communication apparatus 1b according to the second embodiment of the present invention merely makes changes to the function instance 12 to be changed, the instance information management unit 132, and the execution sequence information management unit 131, and does not make any changes to the other existing functions. As a result thereof, the communication apparatus 1b according to the second embodiment of the present invention can add new NW functions or delete NW functions without significantly affecting the operations of the existing functions or stopping the operations of the existing functions.

Third Embodiment

Hereinbelow, a communication apparatus 1c according to a third embodiment of the present invention will be explained. In the communication apparatus 1c according to the present embodiment, a structure allowing coordination between NW functions is added to the above-described communication apparatus 1a according to the first embodiment.

Figure 14:
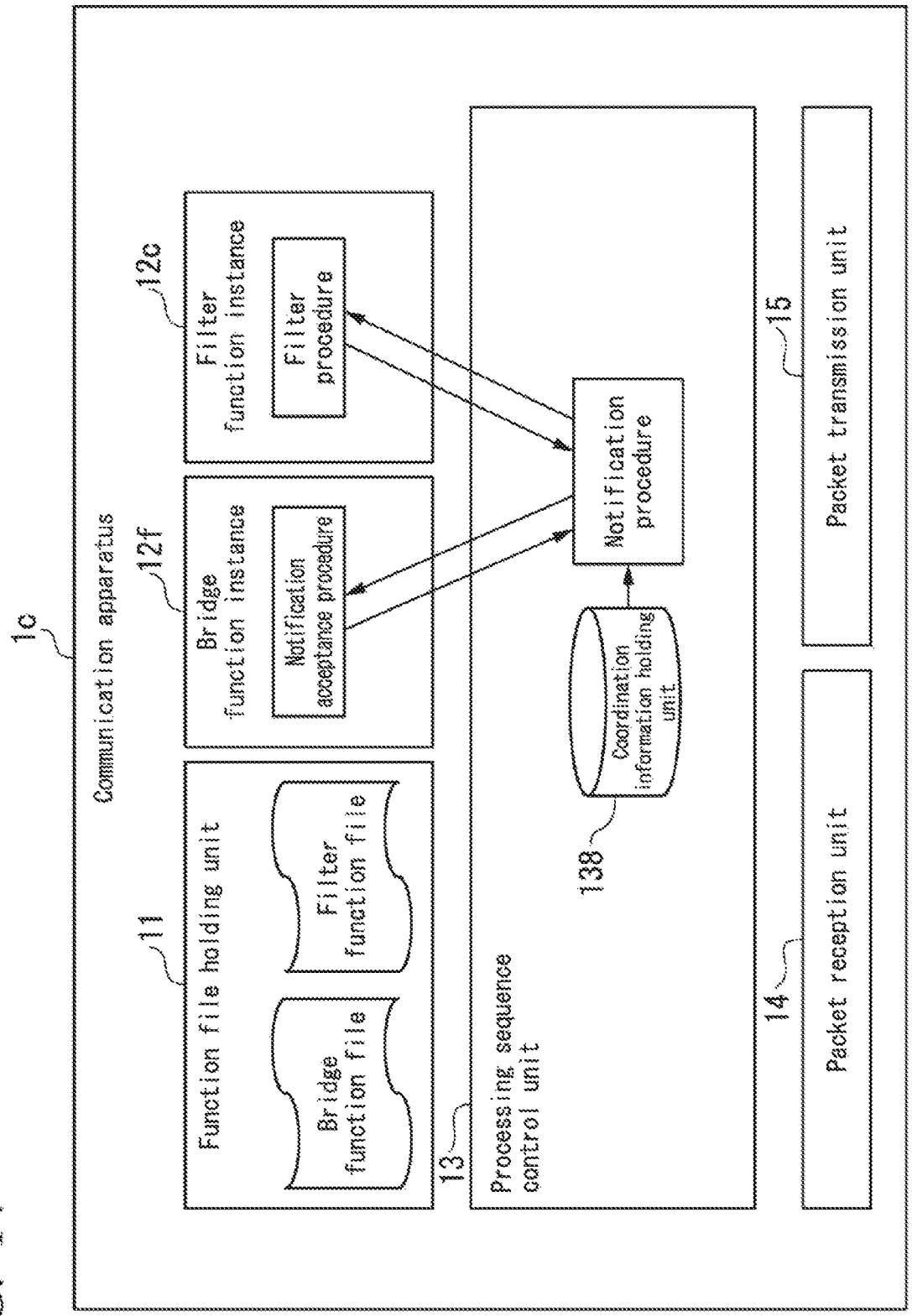
FIG. 14 is a diagram showing an example of operations of coordination between functions performed by the communication apparatus according to a third embodiment of the present invention.

Hereinbelow, the operations in the communication apparatus 1c according to the present embodiment will be explained with reference to the drawings. FIG. 14 is a diagram showing an example of the operations for coordination between functions in the communication apparatus 1c according to the third embodiment of the present invention.

As illustrated in FIG. 14, the communication apparatus 1c according to the third embodiment differs front the above-described communication apparatus 1a according to the first embodiment in that a bridge function file in the function file holding unit 11, a bridge function instance 12f having a notification acceptance procedure, and a coordination information holding unit 138 and a notification procedure in the processing sequence control unit 13 are further provided. It is to be noted that in FIG. 14, the execution sequence information management unit 131, the instance information management unit 132, the function execution unit 133, the packet holding unit 134, the reception function file, the VLAN-ID conversion function file, the transmission function file, the reception function instance 12a, the VLAN-ID conversion function instance 12b, and the transmission function instance 12d are omitted from the illustration.

As illustrated in FIG. 14, in the communication apparatus 1c according to the present embodiment, the respective function instances 12 execute notification acceptance procedures of other function instances 12 via the notification procedure in the processing sequence control unit 13. In other words, the notification acceptance procedures in the respective function instances 12 perform processes in response to information acquisition requests and function execution requests from procedures that belong to other function instances 12. As a result thereof, the communication apparatus 1c according to the present embodiment is able to achieve coordination between functions, in which a certain function acquires the values of variables from other functions or sets the values of variables in other functions.

It is to be noted that the memory address of a notification procedure is transmitted, as an argument, to a function instance 12 by the function execution unit 133 in the processing sequence control unit 13 when executing the starling procedure for the function instance 12. It is to be noted that as mentioned regarding the second embodiment, all of the function instances have a starting procedure and an ending procedure. Additionally, the memory address of the notification acceptance procedure is transmitted to the processing sequence control unit 13 by being included in the instance information serving as the return value when the starting procedure for the function instance 12 ends.

Hereinbelow, the case in which the filter function instance 12c acquires, from the bridge function instance 12f, received number information, which indicates the number of packets received, will be explained with reference to FIG. 14. First, while executing the filter procedure in the filter function instance 12c, the notification procedure of the processing sequence control unit 13 is called. At this time, the filter function instance 12c, which is the source of the call, transmits a coordination type identifier (hereinafter referral to as "coordination type ID"), as an argument, to the notification procedure in the processing sequence control unit 13, which is the destination of the call. The called notification procedure acquires a coordination type table held in the coordination information holding unit 138 in the processing sequence control unit 13.

FIG. 15 is a diagram showing an example of the coordination type table held in the coordination information holding unit 138 in the communication apparatus 1c according to the third embodiment of the present invention. As shown, the coordination type table is a table that associates "coordination type IDs" for indicating coordination types, "coordination content", "argument information" for indicating arguments to be transmitted to the function instances 12 that, are to be called, "called instance IDs" for indicating instance IDs for identifying the function instances 12 that are to be called, and "called procedure IDs" for indicating procedure IDs for identifying procedures in the function instances 12 that are to be called.

It is to be noted that the "coordination type IDs" are not limited to being in the form of consecutive numbers as shown in FIG. 15, and may be of any form that is able to uniquely identify the coordination content.

Additionally, the values in the "coordination type ID", the "coordination content", and the "argument information" categories defined in the coordination type table are made public beforehand, and a developer developing function instances 12 can develop the function instances 12 that are coordinated with other functions on the basis of the public information.

A notification procedure searches the coordination type table using, as a search key, the "coordination type ID" that has been transmitted as an argument, and acquires a "called instance ID" and a "called procedure ID" that respectively correspond to the function instance 12 that is lobe called and the procedure in that function instance 12.

For example, the filter function instance 12c transmits "1", which is the value of the "coordination type ID", to the notification procedure of the processing sequence control unit 13. Then, the notification procedure acquires "5" which is the value of the "called instance ID" corresponding to the bridge function instance 12f, which is the function instance 12 that is to be called, and "1", which is the value of the "called procedure ID" corresponding to the notification acceptance procedure in the bridge function instance. 12f. Then, the notification procedure in the processing sequence control unit 13 calls the notification acceptance procedure of the bridge function instance 12f on the basis of the above-mentioned values of the "called instance ID" and the "called procedure ID".

It is assumed that the bridge function instance 12f counts received packets and bolds received number information indicating the results of the count (the number of packets received). The notification acceptance procedure in the bridge function instance 12f, when its own notification acceptance procedure is called by the notification procedure in the processing sequence control unit 13, reads the above-mentioned, received number information and outputs the received number information, as a return value, to the notification procedure.

The notification procedure in the processing sequence control unit 13, upon acquiring the received number information, outputs said received number information to the filter function instance 12c, which is the source of the call. Due to these: processes, it is possible for the filter function instance 12c to acquire the received number information regarding the received packets without directly executing the procedure in the bridge function instance 12f.

It, is to be noted that the number of notification acceptance procedures belonging to a function instance 12 is not limited to being just one, and it is possible for there to be multiple notification acceptance procedures.

Hereinbelow, the generation of the coordination type table will be explained. The coordination type table may, for example, be generated when functions are added, as described in the second embodiment. If a coordination type table is to be generated when functions are added in this way, it is sufficient that the external coordination unit 135, the instance registration/deletion unit 136, and the execution sequence changing unit 137 described in the second embodiment be provided in the processing sequence control unit 13. When an administrator or the like of the communication apparatus outputs a new function file to the external coordination unit 135, a "procedure ID", a "coordination type ID", "coordination content", and "argument information" for the notification acceptance procedure are transmitted together with the function file and a "function instance ID". The instance registration/deletion unit 136, having received a request to add a function from the external coordination unit 135, updates the execution sequence rule table held in the execution sequence information management unit 131, and then outputs, to the coordination information holding unit 138, the "function instance ID" of the new function instance 12e that has been added, and the "procedure ID", the "coordination type ID", the "coordination content", and the "argument information" acquired from the external coordination unit 135. Then, the coordination information holding, unit 138 writes the acquired information in the coordination type table.

It is to be noted that in the case of a structure in which the processing sequence control unit 13 includes a notification acceptance procedure, is possible for the function instances 12 to acquire and set information that is common to the functions, held in the processing sequence control unit 13.

Modified Example of Third Embodiment

Hereinbelow, a communication apparatus 1d according to a modified example of the third embodiment of the present invention will be explained. In the communication apparatus 1d according to the modified example of the third embodiment, a structure allowing coordination between NW functions is added to the above-described communication apparatus 1a according to the first embodiment, as in the case of the above-described communication apparatus 1c according to the third embodiment.

Figure 16:
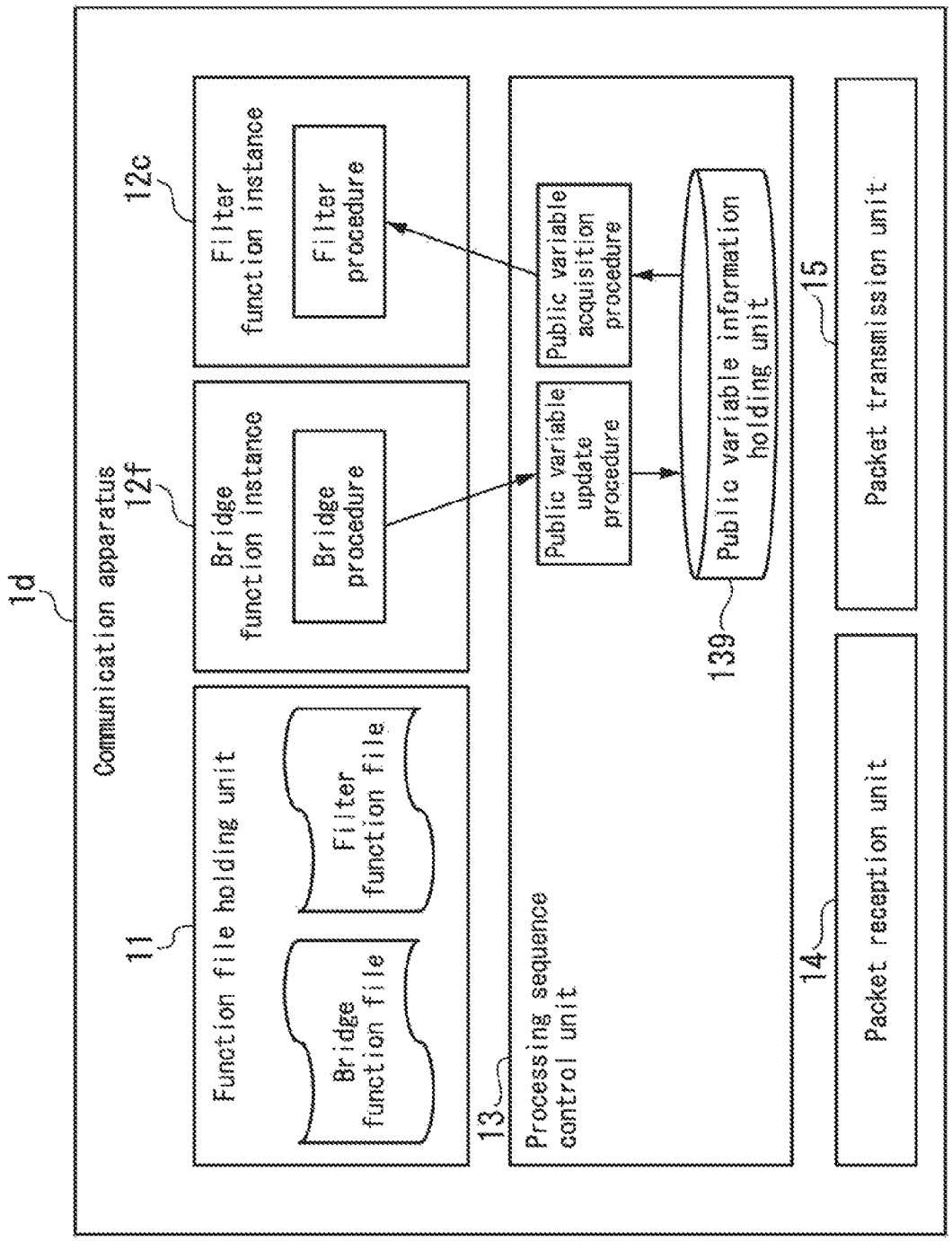
FIG. 16 is a diagram showing an example of operations of coordination between functions performed by the communication apparatus according to a modified example of the third embodiment of the present invention.

Hereinbelow, the operations in the communication apparatus 1d according, to the present modified example will be explained with reference to the drawings. FIG. 16 is a diagram showing an example of the operations for coordination between functions in the communication apparatus 1d according to the modified example of the third embodiment of the present invention.

As illustrated in FIG. 16, the communication apparatus 1d according to the modified example of the third embodiment differs from the above-described communication apparatus is according to the first embodiment in that a bridge function file in the function file holding unit 11 and a bridge function instance 12f are added, and a public variable information holding unit 139, a public variable update procedure, and a public variable acquisition procedure are further provided in the processing sequence control unit 11. It is to be noted that in FIG. 16, the execution sequence information management unit 131, the instance information management unit 132, the function execution unit. 133, the packet holding unit 134, the reception function file, the VLAN-ID conversion function file, the transmission function file, the reception function instance 12a, the VLAN-ID) conversion function instance 12b, and the transmission function instance 12d are omitted from the illustration.

The memory addresses of the public variable acquisition procedure and the public variable update procedure are transmitted, as arguments, to a function instance 12 when the function execution unit 133 in the processing sequence control unit 13 executes the starting procedure for the function instance 12. It is to be noted that as mentioned in the second embodiment, all of the function instances have a starting procedure and an ending procedure.

Hereinbelow, as with the above-described communication apparatus 1c according to the third embodiment, the case in which the filter function instance 12c acquires, from the bridge function instance 12f, received number information indicating the number of packets received will be explained.

The public variable information holding unit 139 holds a public variable table. FIG. 17 is a diagram showing an example of the public variable table held in the public, variable information holding unit 139 in the communication apparatus 1d according to the modified example of the third embodiment of the present invention.

As shown, the public variable table is a table that associates "instance IDs" for identifying function instances 12 that operate nit the communication apparatus 1d, "variable IDs" which are variables belonging to the function instances 12, "variable descriptions" for describing the content of the variables, "variable values" which are the values of the variables, and "possible processes" for indicating processes that are allowed to be performed on the variables. It is to be noted that the "variable IDs" may be character strings or may be numbers or the like as shown in FIG. 17.

It is to be noted that the values in the "variable ID", the "variable description" and the "possible process" categories defined in the public variable table are made public beforehand, and a developer developing function instances 12 can develop the function instances 12 that are coordinated with other functions on the basis of the public information.

The public variable table may, for example, be generated when functions are added described in the above-described second embodiment. If a public variable table is to be generated when functions are added in this way, it is sufficient that the external coordination unit 135, the instance registration/deletion unit 136, and the execution sequence changing unit 137 described in the second embodiment be provided in the processing sequence control unit 13. When an administrator or the like of the communication apparatus outputs a new function file to the external coordination unit 35, a table defining "variable IDs". "variable descriptions", and "possible processes" for a group of variables (public variables), among the variables belonging to a function instance 12, that can only be referenced or that can be both referenced and updated from other function instances 12 is output together with the function file and the function instance ID. The external coordination unit 135 outputs the above-described table to the public variable information holding unit 139. Then, the public variable information holding unit 139 writes information indicating the acquired table in the public variable table.

The respective function instances 12, when needing to acquire information in other function instances 12, call the public variable acquisition procedure in the processing sequence control unit 13 and acquire the variable values to be acquired, Additionally, when the function instances 12 need to transmit information to other function instances 12 or need to update variables held in those function instances 12 themselves or variables in other function instances 12, the respective function instances 12 call the public variable update procedure and transmit information or change rewritable variable values.

In the example shown in FIG. 17, each time a packet is received, the bridge function instance 12f calls the public variable update procedure with the character string "RX_COUNT" an argument to update the "RX_COUNT" value in the public variable table. When acquiring the number of received packets in the bridge function, the bridge function instance 12f calls the public variable acquisition procedure with the character string "RX_COUNT" as an argument to acquire the "RX_COUNT" value in the public variable table.

As described above, the communication apparatus 1d according to the modified example of the third embodiment of the present invention calls the public variable update procedure in the processing sequence control unit 13 each time the respective function instances 12 update the public variables in the function instances 12 themselves. As a result thereof, in the communication apparatus 1d according to the present modified example, the structure of the communication apparatus can be made simpler than that of the communication apparatus 1c according to the third embodiment.

Fourth Embodiment

Hereinbelow, a fourth embodiment of the present invention will be explained. In the communication apparatus according to the present embodiment, a structure for realizing high-speed execution sequence rule searches is added to the above described communication apparatus 1a according to the first embodiment.

Figure 18:
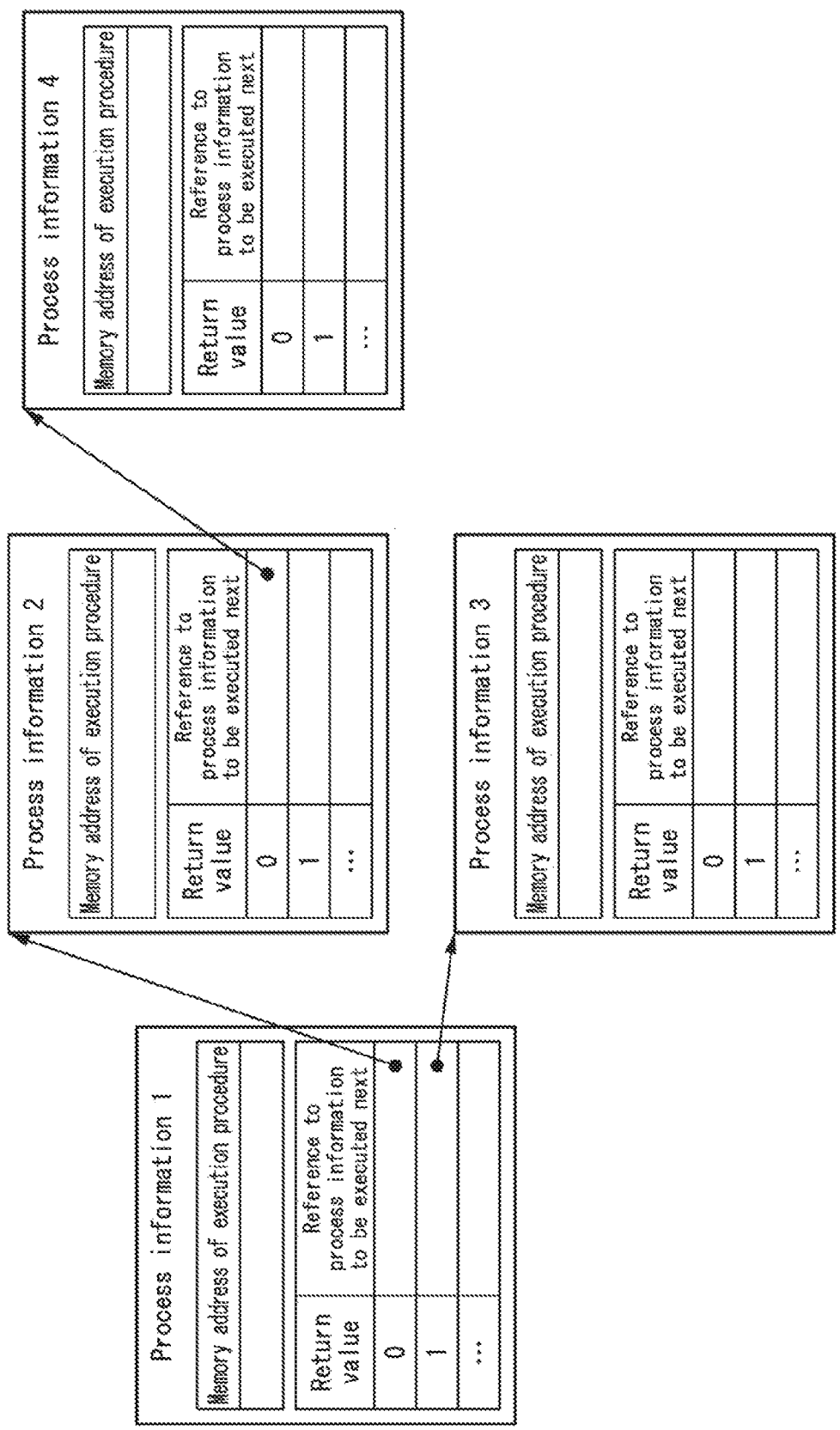
FIG. 18 is a diagram showing an example of an execution sequence rule table held in an execution sequence information management unit in the communication apparatus according to a fourth embodiment of the present invention.

In the present embodiment, the execution sequence rule table held in the execution sequence information management unit 131 is constructed so as to form a tree structure having, as nodes, memory address information for procedures to be executed in accordance with the return value and the execution sequence. FIG. 18 is a diagram showing an example of an execution sequence rule table held in the execution sequence information management unit 131 in the communication apparatus La according to the fourth embodiment of the present invention.

Alter the function execution unit 133 has executed a process (procedure), the function execution unit 133 acquires the memory address of the next node depending on the return value thereof and executes the procedure described at the next node. By repeating these processes, when the procedure in a parent node in the tree structure has been completed, the target for which the process is to be executed moves to a child node.

With the communication apparatus 1a according to the fourth embodiment of the present invention, there is no need to acquire a memory address of a procedure to be executed next from the instance information management unit 132, thus it is possible to execute processes at higher speed. However, if the memory address of a procedure in a certain function instance is changed due to replacement of the function or the like, it is necessary to change not only the function instance information table held in the instance information management unit 132 but also the execution sequence rule table.

Modified Example of Fourth Embodiment

Hereinbelow, a modified example of the fourth embodiment of the present invention will be explained. In the communication apparatus according to the modified example of the fourth embodiment, a structure for realizing high-speed execution sequence rule searches is added to the above-described communication apparatus 1a according to the first embodiment, as in the case of the above-described communication apparatus according to the fourth embodiment.

In the above-described communication apparatus 1a according to the first embodiment, each time a procedure in a function instance ends, a search is perforated on the execution sequence rule table acquired from the execution sequence information management unit 131 using, as the search keys, the execution instance ID, the execution procedure ID, and the return value for that function instance 12, to thereby acquire the next execution instance ID and the next execution procedure ID for the function instance 12 to be executed next.

Figure 19:
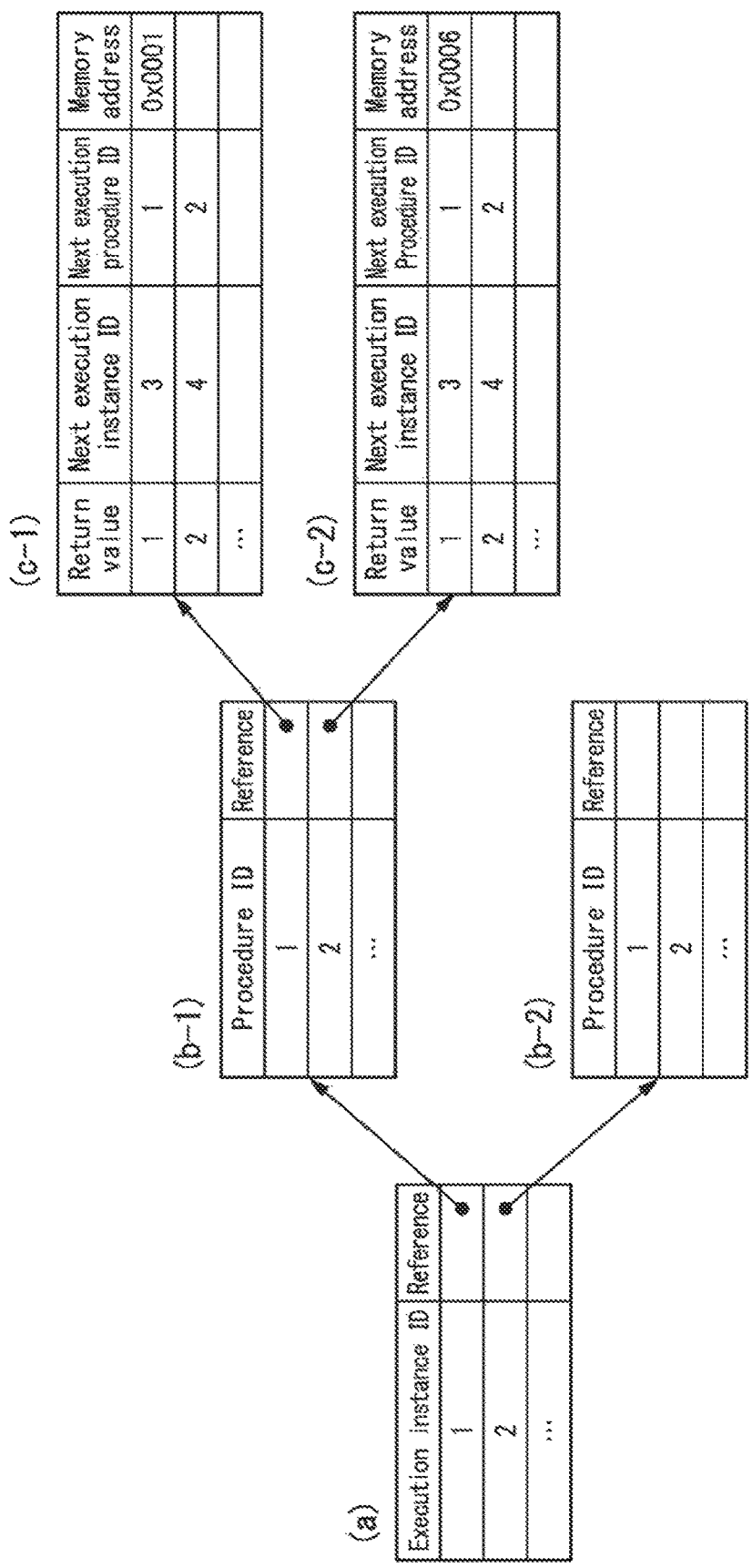
FIG. 19 is a diagram showing an example of an execution sequence rule table held in an execution sequence information management unit in the communication apparatus according to a modified example of the fourth embodiment of the present invention.

On the other hand, as shown in FIG. 19, its possible to ensure that the search is performed at a higher speed by separating the execution sequence rule table beforehand between the execution instance IDs, the procedure IDs, and the return values, which are the search keys, and reconstructing the table to form a tree structure.

As shown in FIG. 19, in the execution sequence rule tables having the execution instance Ins and the procedure as the main keys, the value is a reference to the top rule in the execution sequence rule table for the next search key, and in the execution sequence rule tables having the return value as the main key, the values are the next execution instance ID and the next execution procedure ID. It is to be noted that "memory addresses" in the execution sequence rule tables having the return value as the main key may be omitted. These "memory addresses" will be described below.

When a search is performed, an execution sequence rule table (for example, (a) in FIG. 19) having the execution instance ID as the main key is first searched, the acquired pointer is followed to search an execution sequence rule table (for example, (b-1) or (b-2) in FIG. 19) for a procedure ID, and the acquired pointer is further followed to search an execution sequence rule table (for example, (c-1) or (c-2) FIG. 19) for a return value, thereby acquiring an instance ID and a procedure ID for the function instance 12 to be executed next.

By arranging the execution sequence rule table in a tree structure, in comparison with the computation complexity $O(n)$ for a simple linear search, it is possible to reduce the computational complexity to $O(\log (n))$. In the embodiments of the present invention, a search must be performed each time a packet is processed, thus involving numerous search processes, so the computation complexity reduction effect can be considered to be extremely large.

Memory addresses for procedures to be executed next may be included in the execution sequence rule tables for return values described above. As a result thereof, it is possible to acquire a memory address for a procedure to be executed next without referring to the function instance information table held in the instance information management unit 132.

Additionally, the sequence of rules in each execution sequence rule table with a different main key is not limited to the sequence of rules in the execution sequence rule tables shown in FIG. 19, and the sequence may be changed in accordance with the frequency by which rules are matched. As a result thereof, unnecessary searching may be avoided, and even higher speeds can be expected.

Hereinbelow, a fifth embodiment of the present invention will be explained. In the communication apparatus 1e according to the present embodiment, a structure for realizing high-speed transfer by means of pipelining is added to the above-described communication apparatus 1a according to the first embodiment.

In the communication apparatus 1a according to the first embodiment, the execution of the functions relating to one packet is performed by a single function execution unit 133. In contrast, by executing the functions using multiple function execution units, it is possible to pipeline the processing, and increased throughput can be expected.

Figure 20:
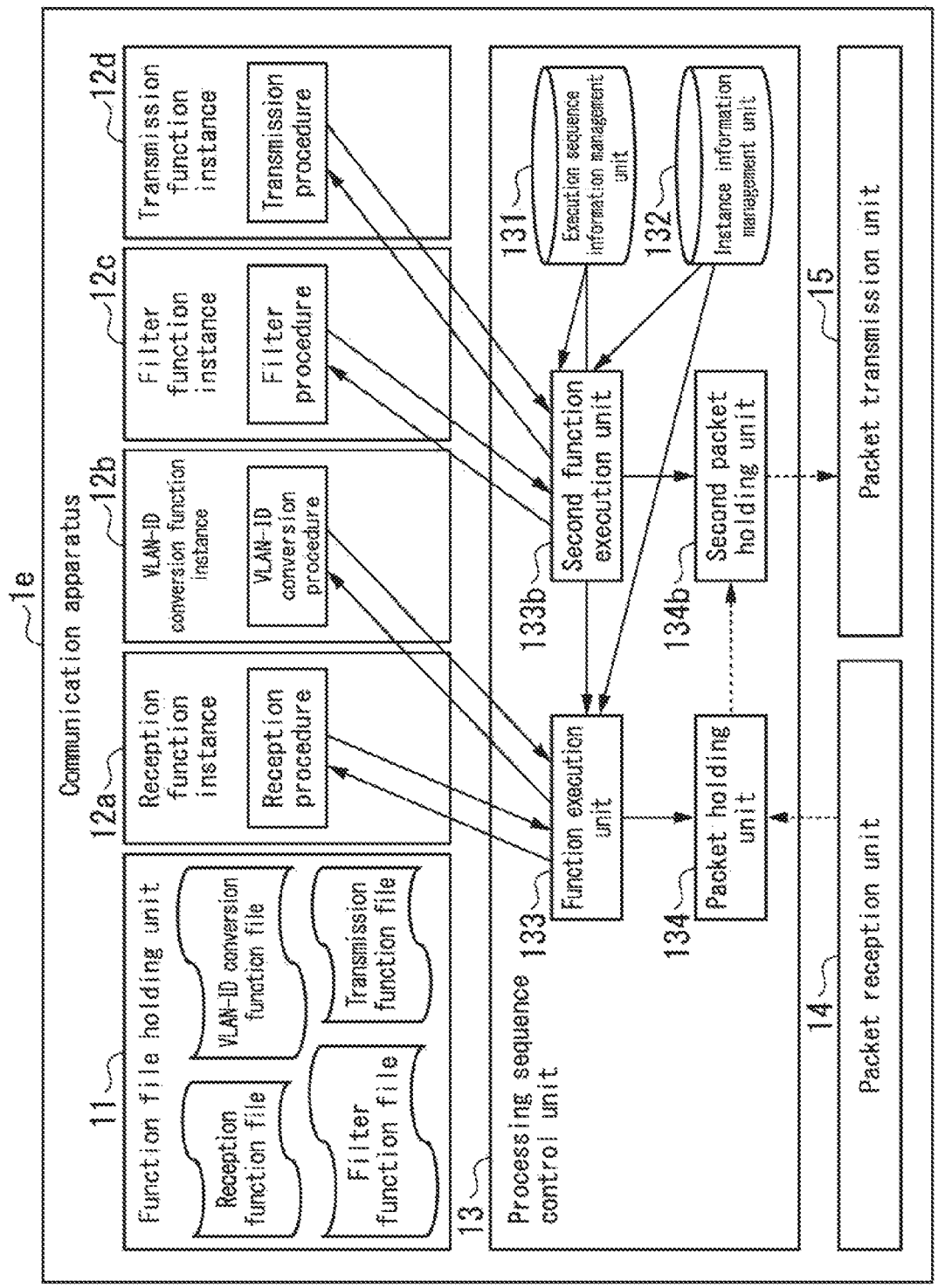
FIG. 20 is a functional block diagram schematically showing the functional structure for the case in which a communication apparatus according to a fifth embodiment of the present embodiment is pipelined.

FIG. 20 is a functional block diagram schematically showing the functional structure for the case in which the communication apparatus 1e according to the fifth embodiment of the present embodiment is pipelined. As illustrated, the communication apparatus 1e according to the present embodiment is pipelined by being provided with two function execution units (the function execution unit 133 and the second function execution unit 133b). Additionally, the structure differs from that of the above-described communication apparatus 1a according to the first embodiment not only in the number of function execution units but also in that two packet holding units (the packet holding unit 134 and the second packet holding unit 134b) are provided. Additionally, since the same number of execution sequence rule tables as the number of function execution units is required, the execution sequence information management unit 131 in the communication apparatus 1e according to the present embodiment has a structure allowing multiple execution sequence rule tables to be managed.

An example in which a combination of two functions, i.e., the VLAN-ID conversion function for convening the VLAN-ID of a packet and the filter function for discarding packets having specific IP addresses, is realized, as in the above-described communication apparatus 1a according to the first embodiment, will be explained.

The function execution unit 133, after receiving a packet and performing VLAN-ID conversion as in the above-described communication apparatus 1a according to the first embodiment, searches an execution sequence rule table for the function execution unit 133, held in the execution sequence information management unit 131, to acquire an instance ID and a procedure ID for the function instance to be executed next.

FIG. 21A and FIG. 21B are diagrams showing examples of execution sequence rule tables held in the execution sequence information management unit 131 for the case in which the communication apparatus 1e according to the fifth embodiment of the present invention is pipelined. As shown, FIG. 21A is an execution sequence rule table for use in the execution function unit 133, and FIG. 21B is an execution sequence rule table for use in the second execution function unit 133b.

As shown, a "99" (in FIG. 21A, indicated as "second packet holding unit (99)") is set as the value in both the "next execution instance ID" and the "next execution procedure ID" categories, indicating that the procedure to be executed next is a transfer procedure to the second packet holding unit 134b. It is to be noted that the function instance information table also includes a row in which the "instance ID" and the "procedure ID" are "99", and said row describes a procedure for acquiring a packet from the packet holding unit 134 and transferring the acquired packet to the second packet holding unit 134b.

On the other hand, the second function execution unit 133b periodically polls the second packet holding unit 134b to confirm whether or not a packet is present therein. Then, upon confirming the presence of a packet, the second function execution unit 133b searches the execution sequence rule table for use by the second function execution unit 133b, held in the execution sequence information management unit 131 to acquire an "execution instance ID" and a "procedure ID".

Since the execution sequence rule table for use by the second function execution unit 133b includes a filter procedure call to the filter function instance 12c, the second function execution unit 133b calls a filter function. After the processing of the filter function, a packet is transmitted from the packet transmission unit 15, as in the above-described communication apparatus 1a according to the first embodiment.

Since the communication apparatus 1e according to the fifth embodiment of the present invention can execute the VLAN-ID conversion in parallel with the execution of the filter function, a high throughput of approximately twice that of the above-described communication apparatus 1a according to the first embodiment can be realized.

Modified Example of Functional Structure of Communication Apparatus

Figure 22A:
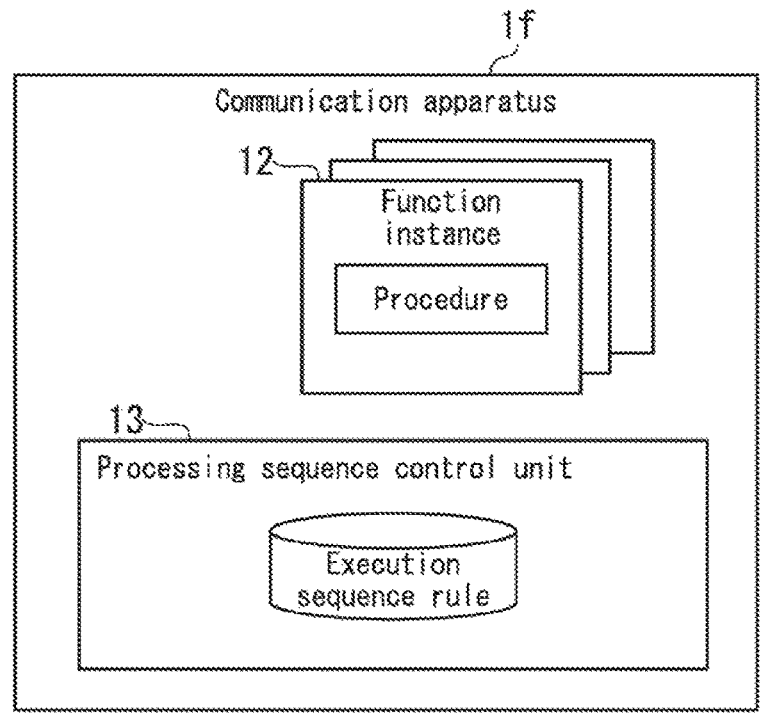
FIG. 22A is a functional block diagram showing the functional structure of a modified example of the communication apparatus shown in FIG. 1.

Next, a modified example of the communication apparatus that is explained with reference to FIG. 1 will be explained. FIG. 22A is a functional block diagram showing the functional structure of the communication apparatus. If according to the present modified example. As illustrated, the communication apparatus 1f is configured so as to include function instances 12 for communication processes and a processing sequence control unit 13. The processing sequence control unit 13 is provided with execution sequence rules indicating an execution sequence for processes and the like relating to NW functions.

Figure 22B:
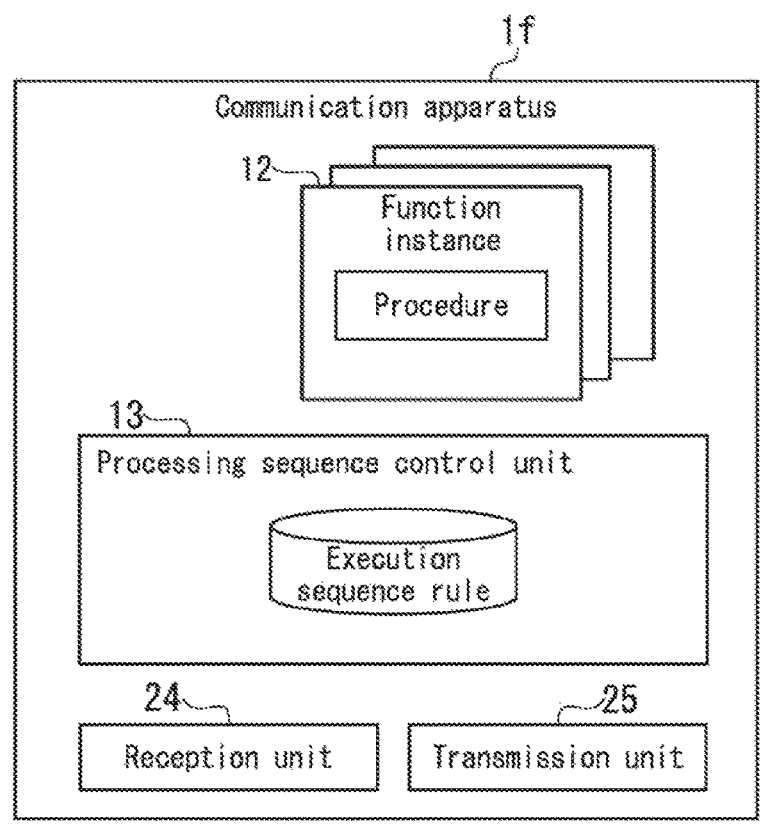
FIG. 22B is a functional block diagram showing the functional structure of the modified example of the communication apparatus shown in FIG. 1.

The function instances 12 each include a procedure for each NW function. The function instance 12 is source code describing groups of procedures and groups of variables necessary for processing of NW functions, a compiled executable file, or the like that is loaded, for example, in memory, a register, or the like, so that NW functions can be processed. The source code, executable file, or the like may be held imide the communication apparatus 1f or may be held in another apparatus outside the communication apparatus 1f. When another apparatus holds the source code, executable file, or the like, the processing sequence control unit 13 reads the source code, executable file, or the like from the other apparatus for every one or more procedures, for every function instance, or for every one of another unit. In this case, in order to allow the processing sequence control unit 13 to communicate with the other apparatus, the communication apparatus 1f is further provided with a reception unit 24 that receives various types of information from the other apparatus and a transmission unit 25 that transmits various types of information to the other apparatus, as shown in FIG. 22B.

Figure 22C:
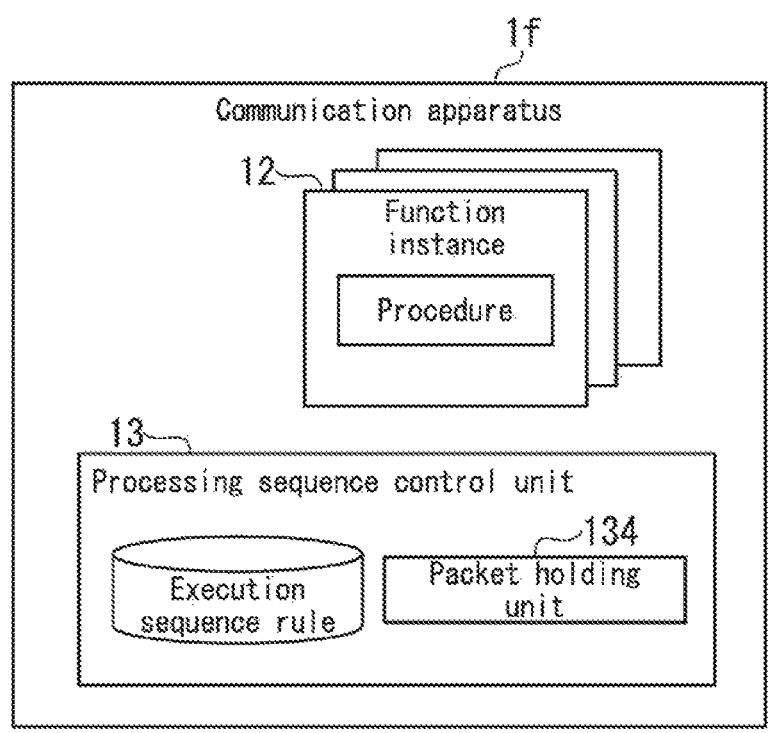
FIG. 22C is a functional block diagram showing the functional structure of the modified example of the communication apparatus shown in FIG. 1.

The processing sequence control unit 13 calls procedures in the function instances 12 in accordance with a defined sequence, and executes processes relating to NW functions on a packet. The packet is held, for example, in a packet holding unit provided inside the communication apparatus 1f. In this case, for example, as shown in FIG. 22C, a packet holding unit 134 is provided in the processing sequence control unit 13, as in FIG. 1. Alternatively, the packet may also be held in a packet holding unit provided outside the communication apparatus 1f. In this case, the communication apparatus 1f is further provided with a reception unit 24 and a transmission unit 25 so as to allow communication with the packet holding unit. Additionally, in a structure in which, the packet is held inside the communication apparatus 1f, when the communication apparatus 1f is provided with multiple processing sequence control units, for example, the packet holding unit 134 may be provided outside these processing sequence control units 13.

In the case in which the processing sequence control unit 13 inside the communication apparatus 1f holds packets, then the communication apparatus 1f, upon receiving a packet input from another apparatus, transfers said packet to the packet holding unit 134, the processing sequence control unit 13 performs designated processes on the packet held in the packet holding unit 134, and after the processes end, discards the packet or outputs the packet to another apparatus.

In the case in which packets are held outside the communication apparatus 1f or the communication apparatus 1f is provided with multiple processing sequence control units, multiple apparatuses (for example, the communication apparatus 1f and another apparatus) or multiple processing sequence control units may share the packet holding unit 134, 115 to be noted that in the case in which multiple apparatuses share the packet holding unit 34, the packet holding unit 134 may be provided inside any of the multiple apparatuses, or the packet holding unit 134 may be provided outside the multiple apparatuses. The processing sequence control unit 13 receives inputs of packet processing privileges or packet addresses from other apparatuses or other processing sequence control units and performs designated processes as an packet held in the packet holding unit 134. After the processing ends, the processing sequence control unit 13 discards the packet, bestows processing privileges of the packet on another apparatus or another processing sequence control unit, or outputs the packet address to another apparatus or another processing sequence control unit.

Alternatively, the former and the latter may be combined. The former is suitable for the case which there is a single communication apparatus on a single unit of hardware. On the other hand, the latter is suitable for the case in which there are multiple virtual apparatuses on a single unit of hardware, or there are multiple processing sequence control units inside a single communication apparatus.

The processing sequence control unit 13 calls a procedure to be executed next in accordance with an execution sequence indicated by execution sequence rules. If there is a return value from the called procedure, the processing sequence control unit 13 calls a procedure to be executed next depending on the procedure that is currently being executed (i.e., the called procedure) and the return value thereof, in other words, the processing sequence control unit 13 calls a procedure belonging to a function instance to be executed depending on the procedure belonging to the previously processed function instance and the return value of that procedure. The procedure to be called may be a procedure belonging to the same function instance as the function instance to which the procedure that is currently being executed belongs, or may be, a procedure belonging to a function instance different from the function instance to which the procedure that as current being executed belongs.

A procedure may be unique to one or multiple apparatuses, or may be unique to one or more function instances. Additionally, when a procedure is called, the procedure may be called by using, for example, an ID that is unique to one or multiple apparatuses, the procedure may be uniquely called by using a combination of a function instance and a procedure, or a function may be called and a procedure within the function may be called thereafter, it is to be noted that procedures in different function instances may be the same procedure. In the case in which procedures in different function instances are the same procedure and the procedures are uniquely called by combinations of function instances and procedures, it may be treated that different combinations of function instances and procedures call the same procedure, or it may be treated that different procedures in which the same processes are performed are called.

In the execution sequence rules, for example, an "execution procedure ID" for identifying a procedure in the function instance 12 that is currently being executed, a "return value" of the executed process, and a "next execution procedure ID" for identifying a procedure in a function instance 12 to be executed next depending on the return value, if there is such a return value, are associated. Alternatively, in the execution sequence rules, an "execution instance ID", an "execution procedure ID", a "return value", a "next execution instance ID", and a "next execution procedure ID" may be associated. Alternatively, in the execution sequence rules, the memory address at which a procedure in the function instance currently being executed is loaded, a return value, and the memory address at which a procedure in a function instance to be executed next is loaded may be associated.

It is to be noted that procedures in a function instance 12 to be executed next may be the same regardless of the return value. Additionally, if the return value is "Null" or if there is no return value, a procedure in a function instance 12 to be executed next may be a procedure in accordance with the procedure in the function instance 12 that is currently being executed such as a procedure identified by an execution sequence rule that is next in the order (in other words, the procedure in the function instance 12 to be executed is a procedure in accordance with a procedure belonging to the previously processed function instance or a predetermined procedure in accordance with a procedure that does not belong to the previously processed function instance), a predetermined procedure such as a procedure identified by the first execution sequence rule, or a procedure for performing a predetermined process such as an initialization process, a process for discarding a packet, and a process for ending a series of procedures.

Additionally, if the return value is "0", the packet may be discarded, the packet holding unit holding the packet may bestow processing privileges or the packet address on another processing sequence control unit inside the communication apparatus 1f or on another apparatus while holding the packet, or the packet holding unit holding the packet may send the packet to another apparatus.

Additionally, the first execution sequence rule designates a procedure in a function instance that, is executed first or designates a procedure and a function instance to be executed first. When the procedure in the function instance to be executed first is to be designated by the value of the "execution procedure ID" and the "return value", then a "0" may be set as the values thereof. When a function instance and a procedure to be executed first are to be designated by the value of the "execution instance ID", the value of the "execution procedure ID", and the "return value", then a "0" may be set as the values thereof. When the procedure in the function instance to the executed first is designated by a "memory address" indicating a location (address) in memory at which said procedure is loaded, said memory address may lie set in the execution sequence rule.

Figure 23:
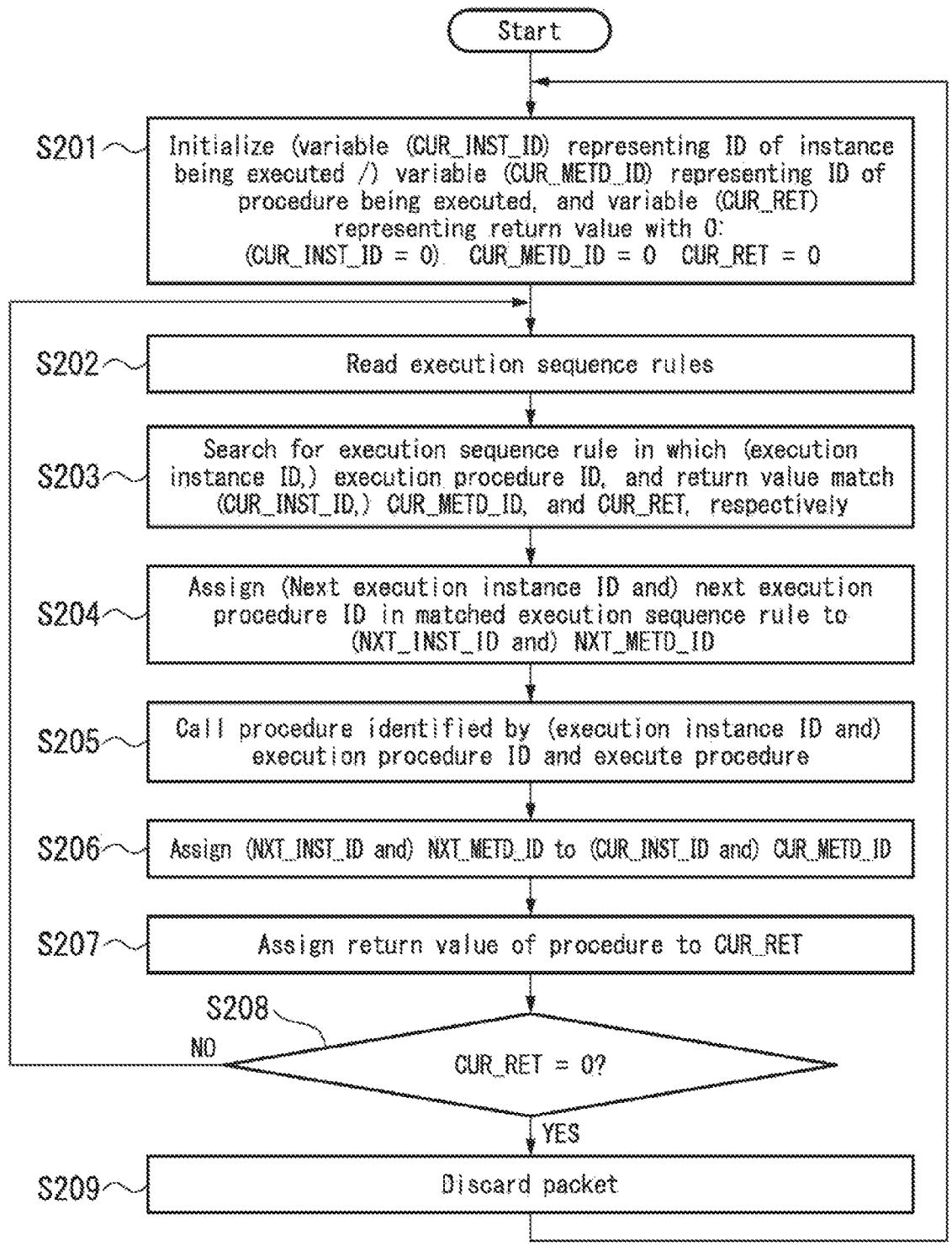
FIG. 23 is a flow chart showing the operations performed by a processing sequence control unit in the modified example of the communication apparatus shown in FIG. 1.
Figure 24:
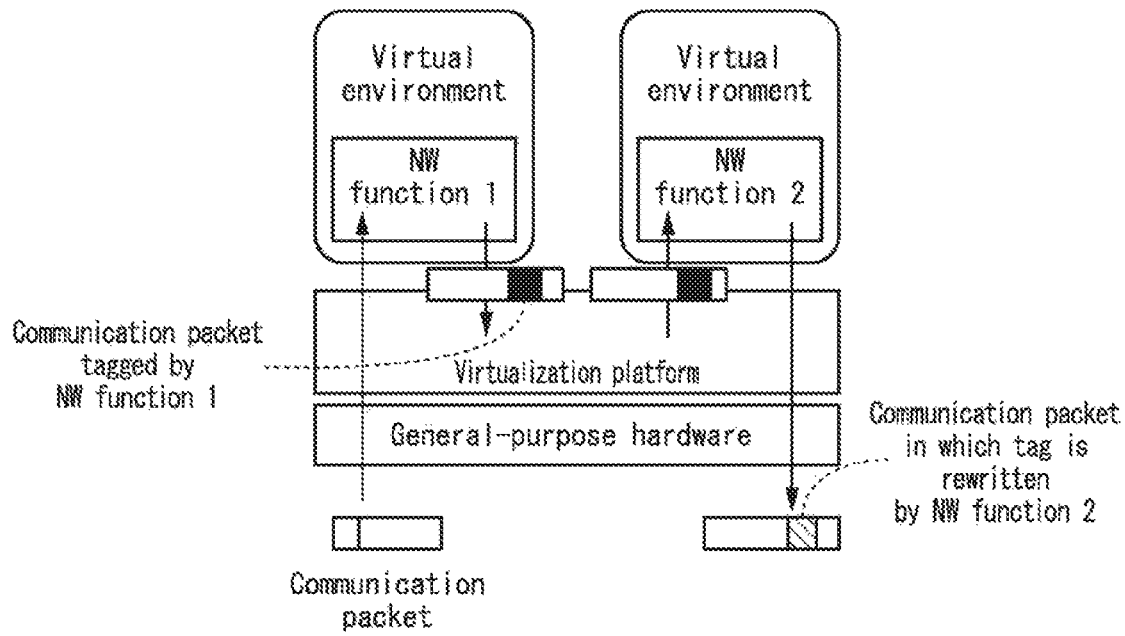
FIG. 24 is a schematic diagram showing a summary of convention service function chaining (SFC).
Figure 25:
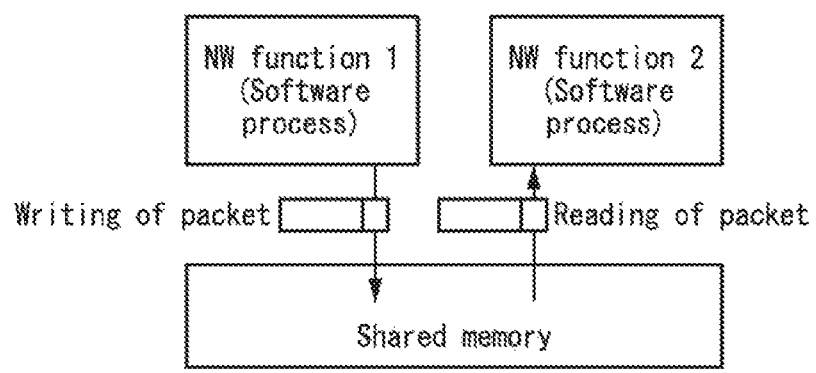
FIG. 25 is a diagram for explaining delays that occur in conventional service function chaining (SFC).

Next, the operations of the communication apparatus 1*f* according to the present modified example will be explained. FIG. 23 is a flow chart showing the operational of the processing sequence control unit 13 according to the present modified example.

First, the processing sequence control unit 13 assigns "0" to the variable CUR_METD_ID, which is the variable representing the execution procedure ID for identifying the procedure in the function instance 12 that is currently being executed, and to the variable CUR_RET, which is the variable representing the return value of said procedure, thereby initializing these variables (FIG. 23, step S201). In this case, if it is not possible to uniquely identify a procedure using only an execution procedure ID and the procedure is identified together with the value of the variable CUR_INST_ID, which is the variable representing the execution instance ID for identifying the function instance 12 that is currently being executed, the processing sequence control unit 13 also assigns a "0" to the variable CUR_INST_ID.

Subsequently, the processing sequence control unit 13 reads execution sequence rules (FIG. 23, step S202). Next, the processing sequence control unit 13, on the basis of the first execution sequence rule, searches for an execution sequence rule in which the value of the "execution procedure ID" and the "return value" respectively match the variable CUR_METD_ID and the variable CUR_RET (FIG. 23, step S203). In this case, when a procedure is identified together with the value of the variable CUR_INST_ID, the processing sequence control unit 13 searches for an execution sequence rule in which the value of the "execution instance ID", the value of the "execution procedure ID", and the "return value" respectively match the variable CUR_INST_ID, the variable CUR_METD_ID, and the variable CUR_RET.

For example, in the first execution sequence rule, the value of the "execution procedure ID" and the "return value" are both "0", and these values match the variable CUR-_METD_ID and the variable CUR_RET, to which "0" is assigned, as mentioned above. In this case, when the procedure is identified together with the value of the variable CUR_INST_ID, the value of the "execution instance ID", the value of the "execution procedure ID", and the "return value" in the first execution sequence rule respectively match the variable CUR_INST_ID, the variable CUR_METD_ID, and the variable CUR_RET. Thus, the processing sequence control unit 13 assigns, to the variable NXT_METD_ID, the value (for example, "1") in the "next execution procedure ID" in the matched execution sequence rule (FIG. 23, step S204). As a result thereof, the variable NXT_METD_ID=1. In this case, when the procedure is identified together with the value of the variable CUR_IN-ST_ID, the processing sequence control unit 13 further assigns, to the variable NXT_INST_ID, the value (for example, "1") in the "next execution instance ID" category in the matched execution sequence rule. As a result thereof, the variable NXT_INST_ID=the variable NXT_MET-D_ID=1.

In this case, the variable NXT_METD_ID, or the variable NXT_INST_ID and the variable NXT_METD_ID are used to indicate the procedure to be executed next. However, the process for converting these variables into locations (addresses) or the like at which the procedures are loaded may be performed by the processing sequence control unit 13 or may be performed by another apparatus or another processing sequence control unit that executes an NW function. Alternatively, a table in which variables are associated with the locations (addresses) or the like at which the procedures are loaded may be provided in the communication apparatus 1*f* or in another apparatus, and said table may be used to indirectly reference the locations (addresses) at which the procedures are loaded. Alternatively, the communication apparatus 1*f* may query another apparatus, the other apparatus may perform a conversion and transmit the location (address) obtained by the conversion to the communication apparatus 1*f*, and the communication apparatus 1*f* may receive said location (address). For example, when a procedure is identified by a combination of information identifying a function instance and information identifying the procedure, the conversion may be performed by using a table or the like associating at least one of "function instance IDs" and "function instance names", at least one of "procedure IDs" and "procedure names", and locations (addresses) at which the procedures are loaded in memory or "memory addresses" indicating the reference destinations for the procedures. Alternatively, when a procedure can be uniquely identified by only the information identifying the procedure, the conversion may be performed by using a table or the like associating at least one of "procedure IDs" and "procedure names" and locations (addresses) at which the procedures are loaded in memory or "memory addresses" indicating reference destinations for the procedures. Additionally, instead of using the variable NXT_IN-ST_ID and the variable NXT_METD_ID, it is possible to use information directly indicating the "memory addresses" indicating the locations (addresses) at which the procedures are loaded in memory or the reference destinations for the procedures.

Subsequently, the processing sequence control unit 13 calls and executes the procedure identified by the "execution procedure ID" matching the variable NXT_METD_ID, or the procedure identified by a combination of the "execution instance ID" and the "execution procedure ID" matching the combination of the variable NXT_INST_ID and tire variable NXT_METD_ID (FIG. 23, step S205). If the process is normally performed, the procedure in the function instance 12 ends the process and outputs, to the processing sequence control unit 13, a return value which is a value (value greater than "0") representing normal termination. In this case, the value representing normal termination is preferably a return value described in the execution sequence rules. It is to be noted that if a packet to be processed is not present, then the procedure in the function instance 12 may output "−1" the return value.

Next, the processing sequence control unit 13 assigns the value of the variable NXT_METD_ID to the variable CUR_METD_ID (FIG. 23, step S206). In this case, when a procedure is identified together with the value of the variable CUR_INST_ID, the processing sequence control unit 13 assigns the variable NXT_INST_ID and the variable NXT_METD_ID, respectively, to the variable CUR_IN-ST_ID and the variable CUR_METD_ID.

Upon receiving the return value from the procedure in the function instance 12 that has executed the process, the processing sequence control unit 13 assigns the return value to the variable CUR_RET (FIG. 23, step S207). If the return value is "0" (FIG. 23, step S208, YES), the processing sequence control unit 13 discards the packet (FIG. 23, step S209) and control returns to the initialization step (FIG. 23, step S201). The subsequent operations are similar to the above-mentioned operations. If the return value is a value other than "0" (T (FIG. 23, step S208, NO), the processing sequence control unit 13 reads the execution sequence rules once again (FIG. 23, step S202), and searches for information indicating the procedure in the function instance to be executed next (FIG. 23, step S203). The subsequent operations are the same as the above-mentioned operations.

As explained above, the respective embodiments of the present invention have an objective of reducing delays, particularly when combining multiple NW functions operating on a single unit of general-purpose hardware. The embodiments of the present invention do not transfer packets between NW functions, and realize combinations of NW functions by executing the NW functions in accordance with as defined sequence without moving the packet data itself. As a result thereof, with the embodiments of the present invention, packet transfer between NW functions does not occur, so delays that would occur within the apparatus can be suppressed. Additionally, the embodiments of the present invention are more effective for suppressing delays in cases in which many small functions are combined.

The communication apparatuses 1 and 1a to 1f in the aforementioned embodiments may be realized, at least partially, in a computer. In that case, it is possible to realize the communication apparatuses by recording programs for realizing their functions in computer-readable recording media, and having a computer system read and run the programs recorded on these recording media. It is to be noted that the "computer system" mentioned here includes operating systems (OSs) and hardware such as peripheral devices. Additionally, "computer-readable recording media" refers to portable media such as flexible disks, magneto-optic disks, read-only memories (ROMS), and compact disc (CD)-ROMs, and also to storage apparatuses, such as hard disks, installed internally in the computer system. Furthermore, the "computer-readable recording media" may include those that dynamically hold the programs for a short time, such as communication cables when the programs are transmitted over a network such as the internet or over a communication line such as a telephone line, and in this case, they may include those that hold the programs for a certain period of time, such as volatile memories inside a computer system used as a server or a client. Additionally, these programs may be for the purpose of realizing some of the aforementioned functions, and furthermore, the aforementioned functions may be realized by being combined with programs that are already recorded in the computer system, or may be realized by using programmable logic devices such as field programmable gate arrays (FPGAs).

As described above, embodiments of the present invention have been explained in detail with reference to the drawings, but the specific structures are not limited to those embodiments, and designs and the like within a range not departing from the gist of the present invention are included.

INDUSTRIAL APPLICABILITY

The present invention can be applied to various communication services. According to the present invention, it is possible to suppress delays occurring within an apparatus.

DESCRIPTION OF REFERENCE SIGNS

1 Communication apparatus
11 Function file holding unit
12 Function instance
13 Processing sequence control unit
14 Packet reception unit
15 Packet transmission unit
131 Execution sequence information management unit
132 Instance information management unit
133 Function execution unit
134 Packet holding unit
135 External coordination unit
136 Instance registration/deletion unit
137 Execution sequence changing unit
138 Coordination information holding unit
139 Public variable information holding unit

The invention claimed is:
1. A communication apparatus comprising:
a memory that stores procedures belonging to function instances of a process in communication; and
a controller that calls a procedure belonging to a function instance to be executed depending on a procedure belonging to a previously processed function instance and a return value of the procedure belonging to the previously processed function instance,
wherein the controller executes processing regarding a plurality of network functions on a same communication packet held in a single packet holder by executing procedures belonging to function instances to be executed to control a processing sequence for the same communication packet,
the controller is implemented by: i) computer executable instructions executed by at least one processor, ii) at least one circuit, or iii) a combination of computer executable instructions executed by at least one processor and at least one circuit, and
if there is no return value, the controller calls, as the procedure belonging to the function instance to be executed, a procedure in accordance with the procedure belonging to the previously processed function instance, a predetermined procedure, or a procedure for performing a predetermined process.
2. A communication apparatus comprising:
a memory that stores procedures belonging to a function instance of a process in communication;
a controller that calls a procedure belonging to a function instance to be executed depending on a procedure belonging to a previously processed function instance and a return value of the procedure belonging to the previously processed function instance;
a receiver that receives a communication packet from an external apparatus; and
a transmitter that transmits the communication packet to the external apparatus or another external apparatus after a predetermined process has been executed on the communication packet,
wherein the controller controls a processing sequence for the communication packet, the controller comprises:

a first holder that holds the communication packet;

function instances that are generated by respectively converting, into an executable format, function files that include groups of procedures and groups of variables necessary for processing in a communication function, and loading the function files in the memory;

a first manager that holds instance information including function instance identifiers identifying the function instances, procedure identifiers identifying procedures belonging to the function instances, and memory addresses indicating locations in the memory of the procedures belonging to the function instances;

a second manager that holds execution sequence information in which the function instance identifiers, the procedure identifiers, return values of the procedures, and procedures belonging to function instances to be executed next are associated; and an executor that, on the basis of the execution sequence information and the instance information, calls the procedure belonging to the function instance to be executed, executes a process based on the procedure belonging to the function instance to be executed on the communication packet held in the first holder, and executes a process based on a procedure belonging to a function instance to be executed next depending on a return value of the process based on the procedure belonging to the function instance to be executed, and each of the controller, the receiver, the transmitter, the first holder, the first manager, the second manager, and the executor is implemented by: i) computer executable instructions executed by at least one processor, ii) at least one circuit, or iii) a combination of computer executable instructions executed by at least one processor and at least one circuit.

3. The communication apparatus according to claim 2, wherein the controller comprises:

a coordinator that acquires, from an external coordination apparatus, a request to add a communication function, to change a communication function, or to delete a communication function;

a changer that requests the second manager to change an execution sequence in response to an execution sequence change request from the external coordination apparatus; and a register/remover that loads the function instance in the memory or deletes the function instance from the memory in response to the request to add the communication function, to change the communication function, or to delete the communication function, the function instance comprises:

a starting procedure that initializes the function instance; and an ending procedure that performs an ending process; and each of the coordinator, the changer, and the register/remover is implemented by: i) computer executable instructions executed by at least one processor, ii) at least one circuit, or iii) a combination of computer executable instructions executed by at least one processor and at least one circuit.

4. The communication apparatus according to claim 2, wherein the function instance comprises a notification acceptance procedure that performs a process in response to an information acquisition request and a function execution request from a procedure belonging to another function instance.

5. The communication apparatus according to claim 2, wherein the controller comprises:

a notification procedure that mediates acquisition of information on another function instance and function execution in response to a request from the procedure belonging to the function instance; and a second holder that outputs information on a notification acceptance procedure in the other function instance in response to a request from the notification procedure; and the second holder is implemented by: i) computer executable instructions executed by at least one processor, ii) at least one circuit, or iii) a combination of computer executable instructions executed by at least one processor and at least one circuit.

6. The communication apparatus according to claim 2, wherein the second manager holds information in a tree structure that is based on an execution sequence and includes, as nodes, memory addresses indicating the locations of the procedures to be executed by the executor, and the executor executes a procedure by transitioning between the nodes in the tree structure depending on the return values on the basis of the information in the tree structure acquired from the second manager when calling the procedure.

7. A communication method by a computer, wherein the communication method comprises:

storing procedures belonging to function instances of a process in communication in a memory; and calling, by a controller, a procedure belonging to a function instance to be executed depending on a procedure belonging to a previously processed function instance and a return value of the procedure belonging to the previously processed function instance, wherein the communication method further comprises executing processing regarding a plurality of network functions on a same communication packet held in a single packet holder by executing procedures belonging to function instances to be executed to control a processing sequence for the same communication packet, the controller is implemented by: i) computer executable instructions executed by at least one processor, ii) at least one circuit, or iii) a combination of computer executable instructions executed by at least one processor and at least one circuit, and if there is no return value, the controller calls, as the procedure belonging to the function instance to be executed, a procedure in accordance with the procedure belonging to the previously processed function instance, a predetermined procedure, or a procedure for performing a predetermined process.

8. A communication method by a computer, wherein the communication method comprises:

storing procedures belonging to a function instance of a process in communication in a memory;

calling, by a controller, a procedure belonging to a function instance to be executed depending on a procedure belonging to a previously processed function instance and a return value of the procedure belonging to the previously processed function instance;

receiving, by a receiver, a communication packet from an external apparatus; and transmitting, by a transmitter, the communication packet to the external apparatus or another external apparatus after a predetermined process has been executed on the communication packet, wherein in the calling of the procedure belonging to the function instance to be executed, the controller controls a processing sequence for the communication packet, the communication method further comprises:

holding, by a holder, the communication packet;

generating, by an executor, function instances by respectively converting, into an executable format, function files that include groups of procedures and groups of variables necessary for processing in a communication function, and loading the function files in the memory;

holding, by a first manager, instance information including function instance identifiers identifying the function instances, procedure identifiers identifying procedures belonging to the function instances, and memory addresses indicating locations in the memory of the procedures belonging to the function instances; and holding, by a second manager, execution sequence information in which the function instance identifiers, the procedure identifiers, return values of the procedures, and procedures belonging to function instances to be executed next are associated, and in the calling of the procedure belonging to the function instance to be executed, the executor, on the basis of the execution sequence information and the instance information, calls the procedure belonging to the function instance to be executed, executes a process based on the procedure belonging to the function instance to be executed on the communication packet held in the holder, and executes a process based on a procedure belonging to a function instance to be executed next depending on a return value of the process based on the procedure belonging to the function instance to be executed; and each of the controller, the receiver, the transmitter, the holder, the executor, the first manager, and the second manager is implemented by: i) computer executable instructions executed by at least one processor, ii) at least one circuit, or iii) a combination of computer executable instructions executed by at least one processor and at least one circuit.

* * * * *